United States Patent
Ohta et al.

(10) Patent No.: US 7,376,247 B2
(45) Date of Patent: May 20, 2008

(54) TARGET DETECTION SYSTEM USING RADAR AND IMAGE PROCESSING

(75) Inventors: Akihiro Ohta, Kobe (JP); Kenji Oka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 223 days.

(21) Appl. No.: 11/188,160

(22) Filed: Jul. 21, 2005

(65) Prior Publication Data
US 2005/0271253 A1    Dec. 8, 2005

Related U.S. Application Data

(62) Division of application No. 09/834,403, filed on Apr. 13, 2001, now abandoned.

(30) Foreign Application Priority Data

| Apr. 14, 2000 | (JP) | ............................ 2000-118549 |
| May 18, 2000 | (JP) | ............................ 2000-152695 |

(51) Int. Cl.
    *G06K 9/00* (2006.01)
(52) U.S. Cl. .................. 382/103; 342/52; 342/55; 342/70; 342/46; 372/118; 372/26 R; 372/26 D; 382/100
(58) Field of Classification Search ................ 342/52, 342/55, 70, 27, 66, 90, 95–97, 26 R, 26 A–26 D, 342/28, 46; 372/118–146; 382/100, 103, 382/107
See application file for complete search history.

(56) References Cited

U.S. PATENT DOCUMENTS

| 5,430,450 | A |  | 7/1995 | Holmes |
| 5,706,355 | A |  | 1/1998 | Raboisson et al. |
| 6,042,050 | A | * | 3/2000 | Sims et al. ................ 244/3.17 |
| 6,259,803 | B1 | * | 7/2001 | Wirtz et al. ................. 382/103 |
| 6,275,773 | B1 |  | 8/2001 | Lemelson et al. |
| 6,377,191 | B1 |  | 4/2002 | Takubo |
| 6,414,712 | B1 |  | 7/2002 | Wanielik et al. |
| 6,496,592 | B1 | * | 12/2002 | Lanini ........................ 382/103 |
| 6,498,972 | B1 |  | 12/2002 | Rao et al. |
| 6,580,385 | B1 | * | 6/2003 | Winner et al. ................ 342/70 |
| 6,763,125 | B2 |  | 7/2004 | Ohta |
| 7,202,776 | B2 | * | 4/2007 | Breed ......................... 340/435 |

* cited by examiner

*Primary Examiner*—Brian Werner
*Assistant Examiner*—Shefali Goradia
(74) *Attorney, Agent, or Firm*—Christie, Parker & Hale, LLP

(57) ABSTRACT

A target detection system using an EHF radar and the image processing is disclosed, in which the processing time is shortened by mutually complementing the disadvantages of the EHF radar and the image processing thereby to improve the reliability. The system comprises a radar, an image acquisition unit and an image processing ECU. The microcomputer of the ECU specifies an image recognition area based on the power output from the radar, and carries out the image processing only within the specified recognition area for the image obtained from the image acquisition unit. By performing the image processing only for the area where a target is detected by the radar, the time required for image processing is shortened on the one hand and the erroneous detection of letters on the road surface or the like is eliminated.

9 Claims, 31 Drawing Sheets

TARGET DETECTION SYSTEM USING RADAR AND IMAGE PROCESSING

CROSS-REFERENCE TO RELATED APPLICATION(S)

This application is a divisional of U.S. application Ser. No. 09/834,403, filed Apr. 13, 2001 now abandoned, which claims priority of Japanese patent Application No. 2000-118549, filed Apr. 14, 2000, and Japanese patent Application No. 2000-152695, filed on May 18, 2000, priority of which are claimed herein.

BACKGROUND OF THE INVENTION

1. Field of the Invention

The present invention relates to a target detection system. The target detection system according to this invention is mounted on an automotive vehicle, for example, and is used to aid the driver in driving the vehicle by detecting a preceding vehicle running ahead of his vehicle or an obstacle lying ahead or the like target located ahead of the vehicle driven by the driver.

2. Description of the Related Art

A conventional target detection system uses a fusion algorithm in which the reliability of data is studied by use of the result of detecting a target using a EHF radar and the result of detecting a target by image processing thereby to achieve the optimal result. Such a target detection system comprises an EHF radar, a left camera, a right camera and an image processing ECU (electronic control unit). The ECU includes an image processing microcomputer and a fusion processing microcomputer.

In the processing method using the EHF radar, a specified area ahead is scanned by the extremely high-frequency wave. The strength of the signal power output from the EHF radar and the range are so related to each other that the signal power strength is high for the portion where a target exists and low for the portion where a target does not exist. The EHF radar can measure a far distance with high accuracy but is low in accuracy for the measurement of a near target. Also, the EHF radar outputs a near flag upon detection of a near target.

The image processing microcomputer extracts the edge of each of the two images acquired by the two cameras. The edge positions of the two images are different due to the parallax error between the left and right cameras, and this difference is used to calculate the distance to the target. Image processing can be used to measure the distance over a wide range but is low in accuracy for detection of a far target.

The distance measurement by image processing further has the following problems.

1. (Erroneous recognition) In view of the fact that the edge extraction processing is for simply extracting the edges from an image, the edges of letters written on the road surface, shadows or other objects not three-dimensional and different from the target may be extracted erroneously due to the density difference thereof. In such a case, edges are output in spite of the absence of a target.

2. (Erroneous distance measurement) In the case where an edge is detected by the edge extraction processing, the distance is measured by pattern matching between the images acquired by the two cameras. In this processing, the result may become erroneous in the case where a similar pattern happens to exist.

FIG. 1 shows detection areas defined for the target detection system.

An area 2 in which a target can be detected by image processing has a large range, while an area 3 where a target can be detected by an EHF radar reaches a far distance. In an area 4 where a target can be detected by using both the image processing and the EHF radar, on the other hand, a target can be recognized very reliably by the fusion processing between the output data of the radar and the output data of the image processing. The area 4 is called the fusion area. The microcomputer for fusion processing determines the presence or absence of a target based on an overall decision on both the result of detection by the EHF radar and the result of detection by the image processing microcomputer, and thus recognizes the presence of a target such as a preceding vehicle and calculates the distance, etc.

In the conventional target detection system, the processing time for the fusion algorithm in the fusion processing microcomputer is required in addition to the processing time for the EHF radar and the processing time for the image processing microcomputer, and therefore the total processing time is long. Also, the conventional target detection system has yet to overcome the disadvantages of both the EHF radar, and image processing, sufficiently.

SUMMARY OF THE INVENTION

An object of the present invention is to provide a target detection system using the EHF radar and image processing, wherein the processing time for detection is shortened while compensating for the disadvantages of the EHF radar and image processing with each other.

Another object of the invention is to provide a target detection system using both the EHF radar and the image processing, wherein the reliability is improved by preventing erroneous recognition and erroneous distance measurement in image recognition processing.

The present invention has been developed in order to achieve the objects described above. According to one aspect of the invention, there is provided a target detection system comprising a radar, an image acquisition unit and a processing unit. The processing unit specifies an area for image recognition based on the data output from the radar, and processes image data output from the image acquisition unit only within the specified area thereby to detect a target. According to this invention, objects other than three-dimensional ones, including lines or letters on the road surface are not detected by the radar as a target, and therefore lines, letters and other auxiliary objects are not detected as a target by image processing. Also, the image data are processed only for an area where a target such as an obstacle or a vehicle is detected by the radar, and therefore the time required for processing the image data is shortened thereby shortening the processing time, as a whole, for target detection.

In the target detection system according to this invention, the image recognition area can be specified based on the power of the signal output from the radar. Upon detection of a target such as an obstacle or a vehicle, the radar outputs a signal of predetermined power. A target is extracted only from an area having such a target by extracting the edge of the image data only for the particular area from which the signal power is detected. As a result, the time required for image data processing can be shortened. By the way, all the edges may be extracted from the image data and only the edges existing in the image recognition area may be processed as effective edges for target detection. In such a case, the time required for image processing is not shortened but the time required for fusion processing can be shortened.

In the target detection system according to this invention, the image recognition area can be determined based on the state of the near flag output from the radar. Upon detection of a near target, the radar outputs a near flag, the state of which changes with the distance to the target. In the processing for target detection, the edge data acquired in the image processing is selected in accordance with the presence or absence and the state of the near flag, and therefore the recognition error and the distance measurement error of the target can be prevented before the fusion processing.

Further, in the target detection system according to this invention, a road surface flag and a letter flag can be attached to the edge data extracted by image processing in the case where a density difference on the image due to lines or letters on the road surface is detected. For the edge data with the road surface flag or the letter flag, it is determined whether the edge data including the particular road surface flag or the letter flag actually represents lines or characters written on the road surface. In the case where the edge data are found to represent lines or letters, the data in the particular area is invalidated. As a result, the recognition error in which lines or characters on the road surface are recognized as a target and the measurement error can be prevented before the fusion processing.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

First, an explanation will be given of the principle of fusion processing for target detection which is used in a target detection system according to this invention.

Figure 2:
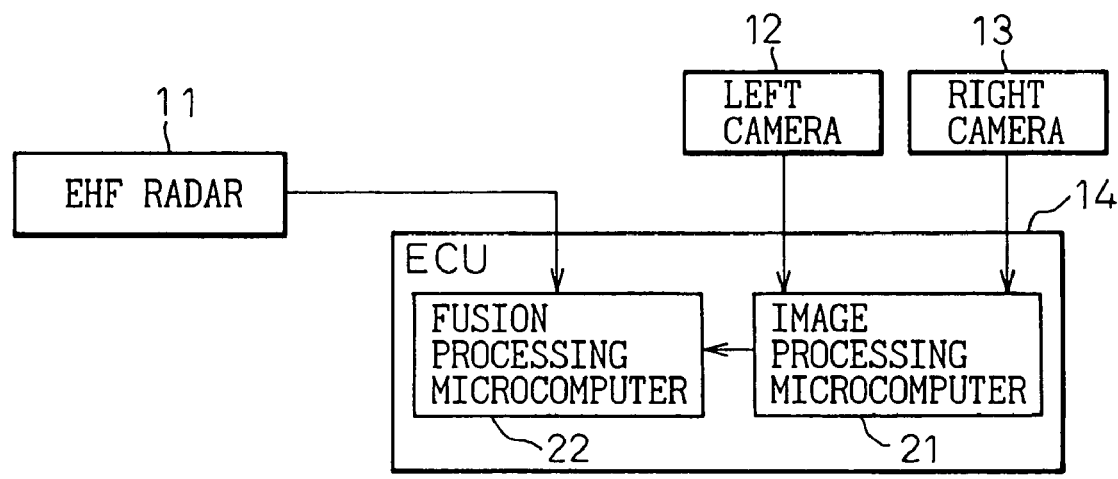
FIG. 2 shows a basic configuration of a target detection system.

As shown in FIG. 2, the target detection system comprises an EHF radar 11, a left camera 12, a right camera 3 and an image processing ECU 14. The ECU 14 is configured with an image processing microcomputer 21 and a fusion processing microcomputer 22. The image processing microcomputer 21 detects a target by processing the image data obtained from the cameras 12, 13. Specifically, edges are extracted from the images obtained from the left and right cameras 12, 13, and the parallax is calculated from the left and right positions of edge extraction thereby to calculate the distance value. The processing operation of the image processing microcomputer 21 will be explained with reference to FIG. 3.

Figure 3:
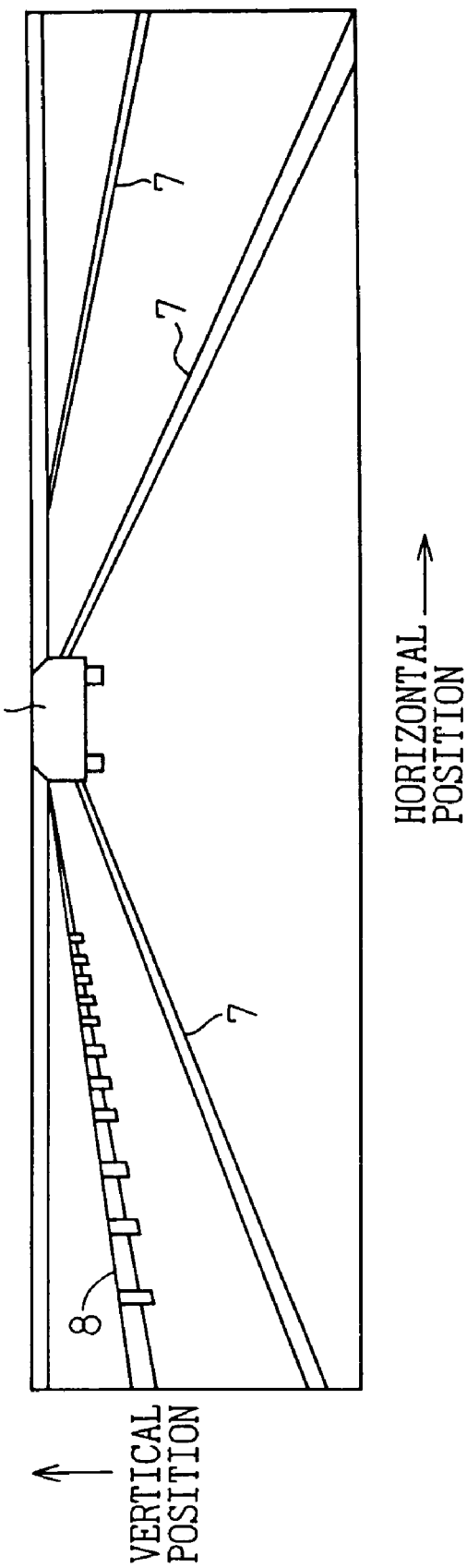
FIG. 3 shows an image picked up as the condition ahead of the target detection system.
Figure 4:
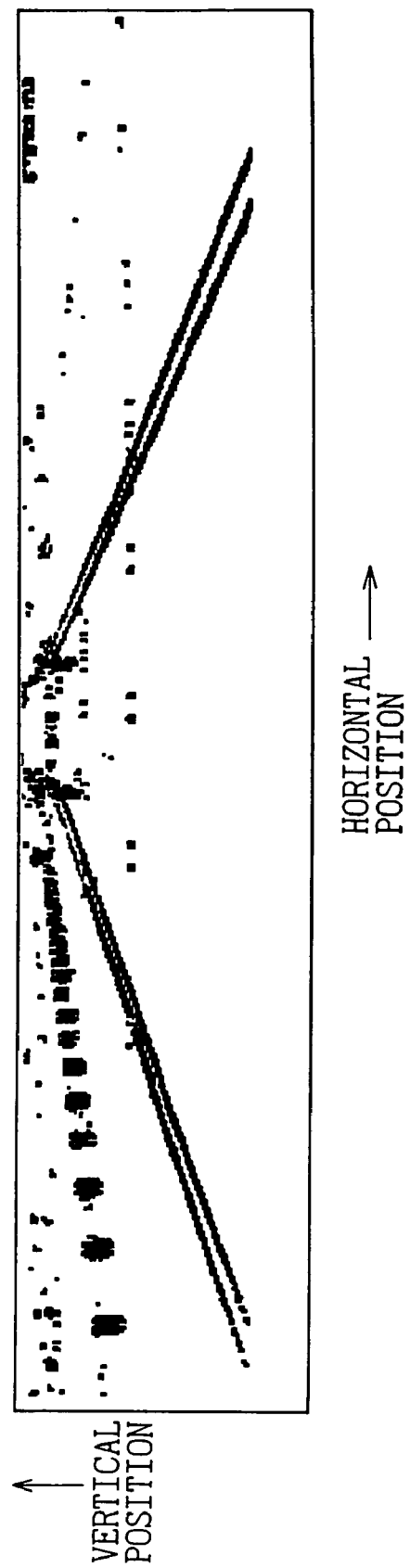
FIG. 4 is a diagram showing the edges calculated by the image processing in the system of FIG. 2.
Figure 5:
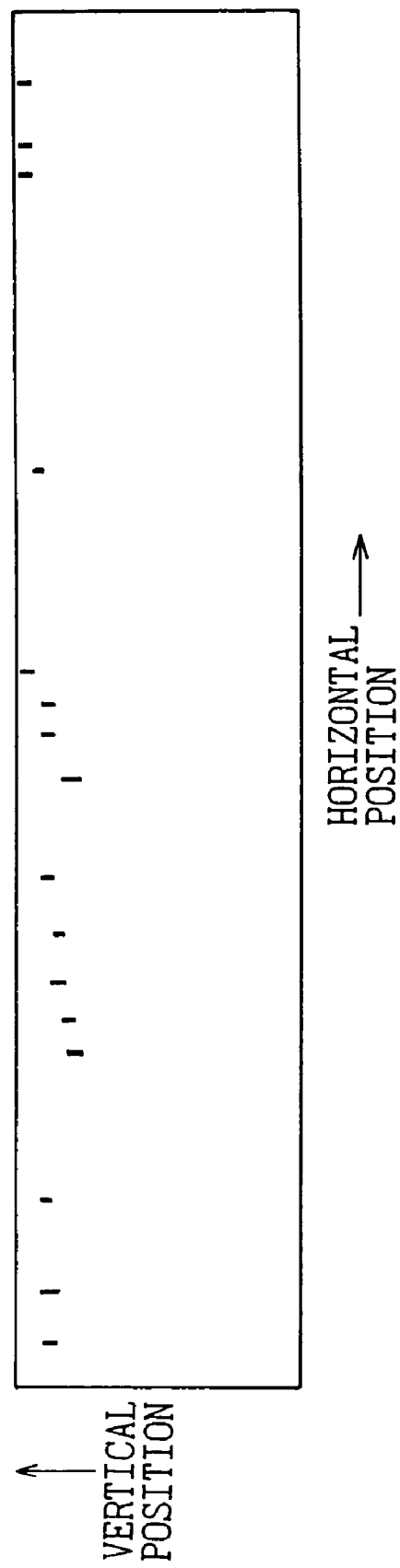
FIG. 5 is a diagram showing typical edges extracted by processing the edges of FIG. 4.

FIG. 3 shows a picked-up image of the condition ahead of the target detection system. Ahead of the vehicle, there is a preceding vehicle 6, lines 7 are drawn on the road surface, and a guard rail 8 is present at a shoulder. FIG. 4 shows the result of calculating the edges by processing the image of FIG. 3, and FIG. 5 the result of extracting the edges in the descending order of peak strength by processing the result of FIG. 4. In FIG. 5, the vertical short lines represent the edges extracted. The image processing microcomputer 21 extracts the edges of FIG. 5 from the left and right cameras 12, 13 and calculates the distance to the target using the parallax.

Figure 6:
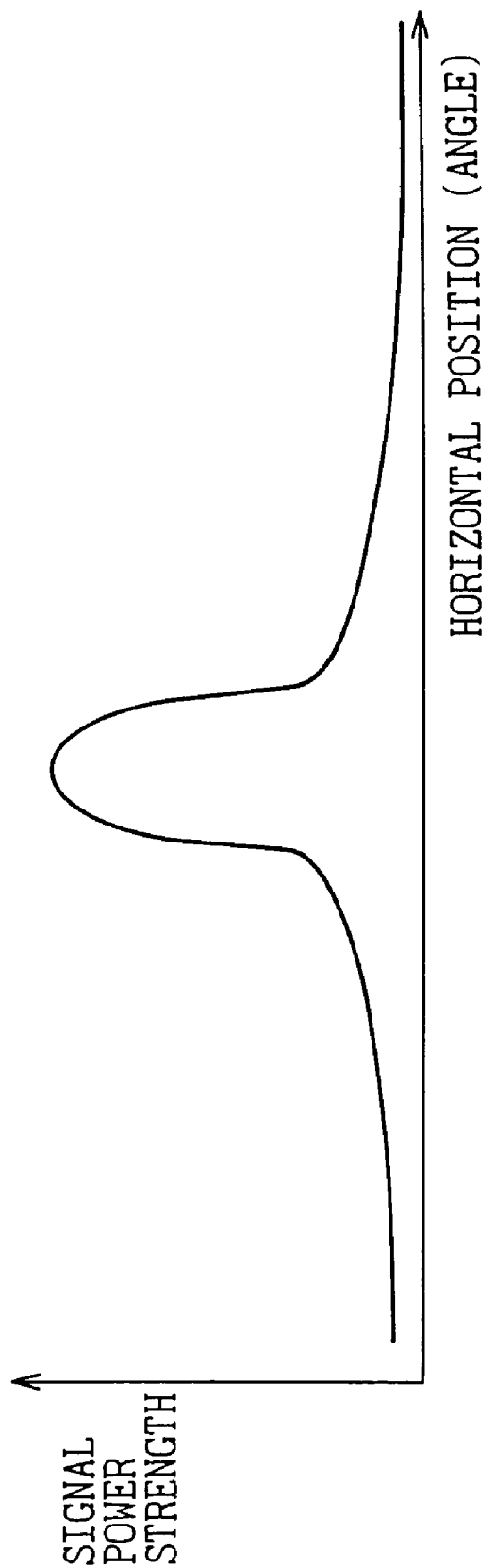
FIG. 6 is a diagram showing the data output from the EHF radar of FIG. 2.

In the processing method of the EHF radar 11, the interior of a specified area is scanned by the EHF radar and the portion of the output data having strong power is recognized as a target. FIG. 6 shows the relation between the horizontal position (angle or range) of the scanned area and the power strength of the data output from the EHF radar 11. It is seen that the power strength of the portion where the target is present is high, and vice versa.

The fusion processing microcomputer 22 determines whether a target is present or not by overall analysis of the detection result of the EHF radar 11 and the detection result of the image processing microcomputer 21, and thereby checks the presence of a target such as a preceding vehicle and calculates the distance to the preceding vehicle.

Embodiment 1

Figure 7:
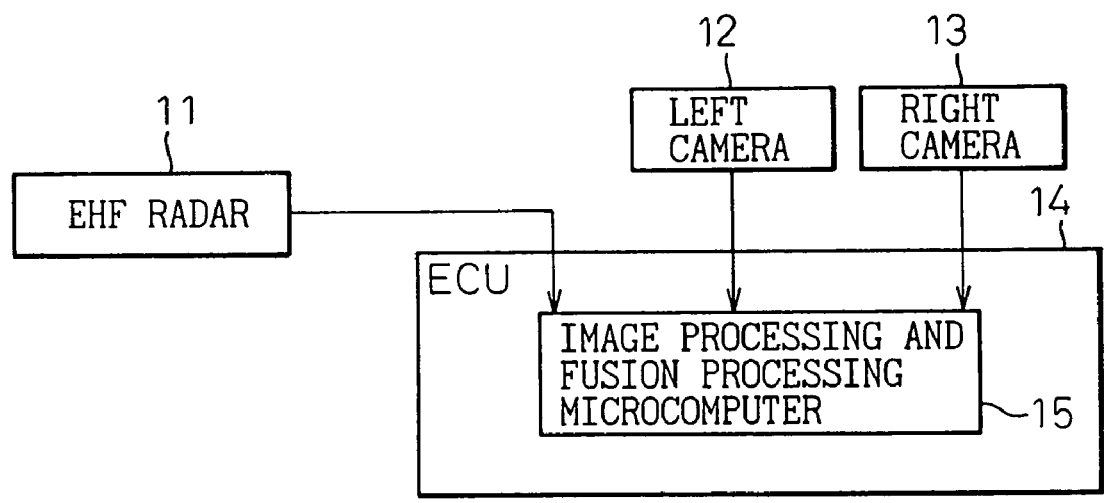
FIG. 7 is a vehicle target detection system according to a first embodiment of the invention.

FIG. 7 shows a vehicle target detection system according to a first embodiment of the invention.

A vehicle target detection system comprises an EHF radar 11, a left camera 12, a right camera 13 and an image processing ECU 14. The ECU 14 is configured with a microcomputer 15 having the dual functions of image processing and fusion processing. Although the two cameras 12, 13, left and right, are used for measuring the distance by parallax in image processing, only one camera will do in the case where the distance is not measured by parallax.

Now, the processing in the microcomputer 15 will be explained.

Embodiment 1-1

Figure 8:
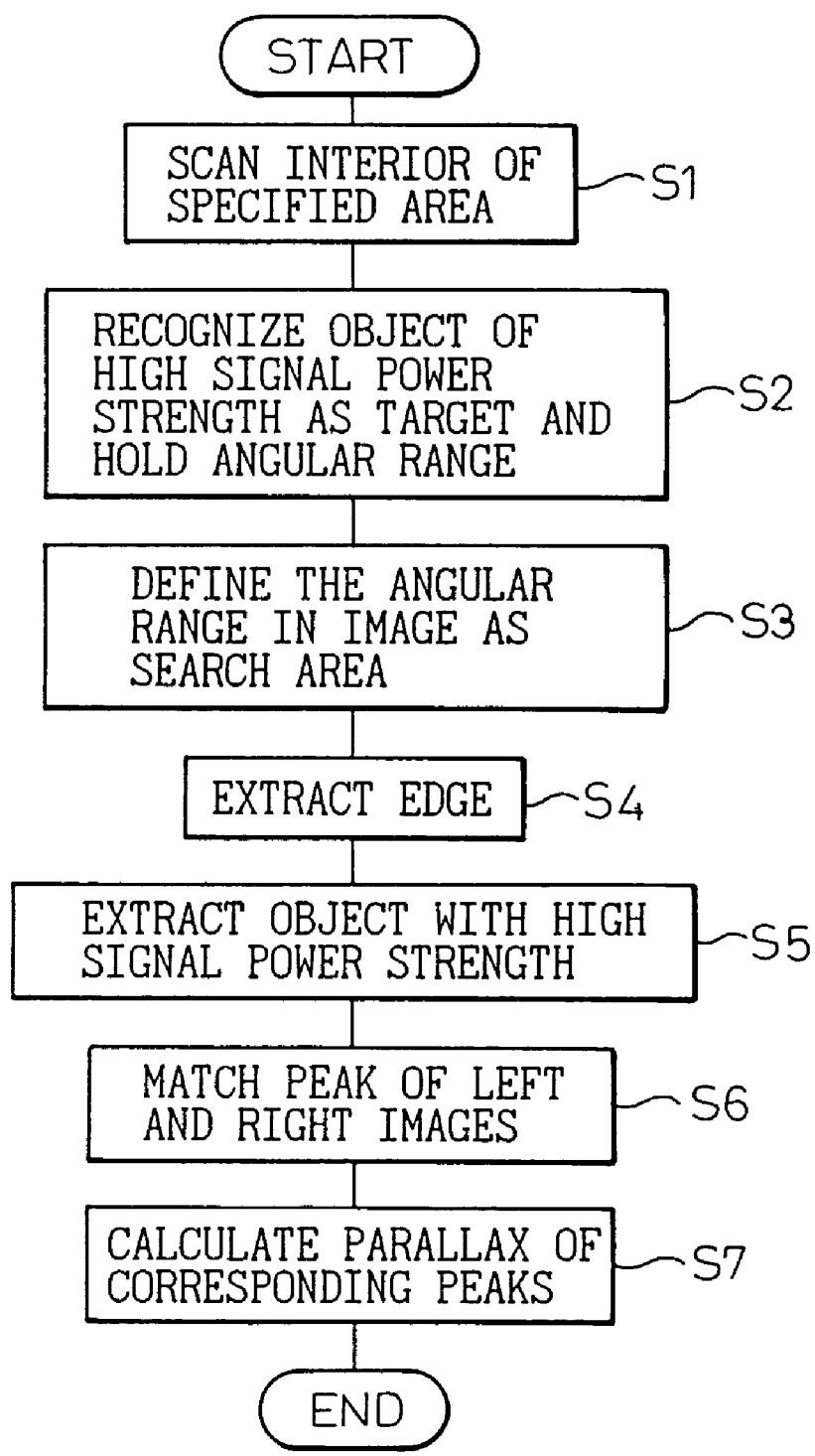
FIG. 8 is a flowchart showing the processing steps of the microcomputer of FIG. 7.

FIG. 8 is a flowchart showing the processing in the microcomputer 15. The condition ahead of the vehicle is assumed to be the same as shown in FIG. 3 and described above.

Figure 9:
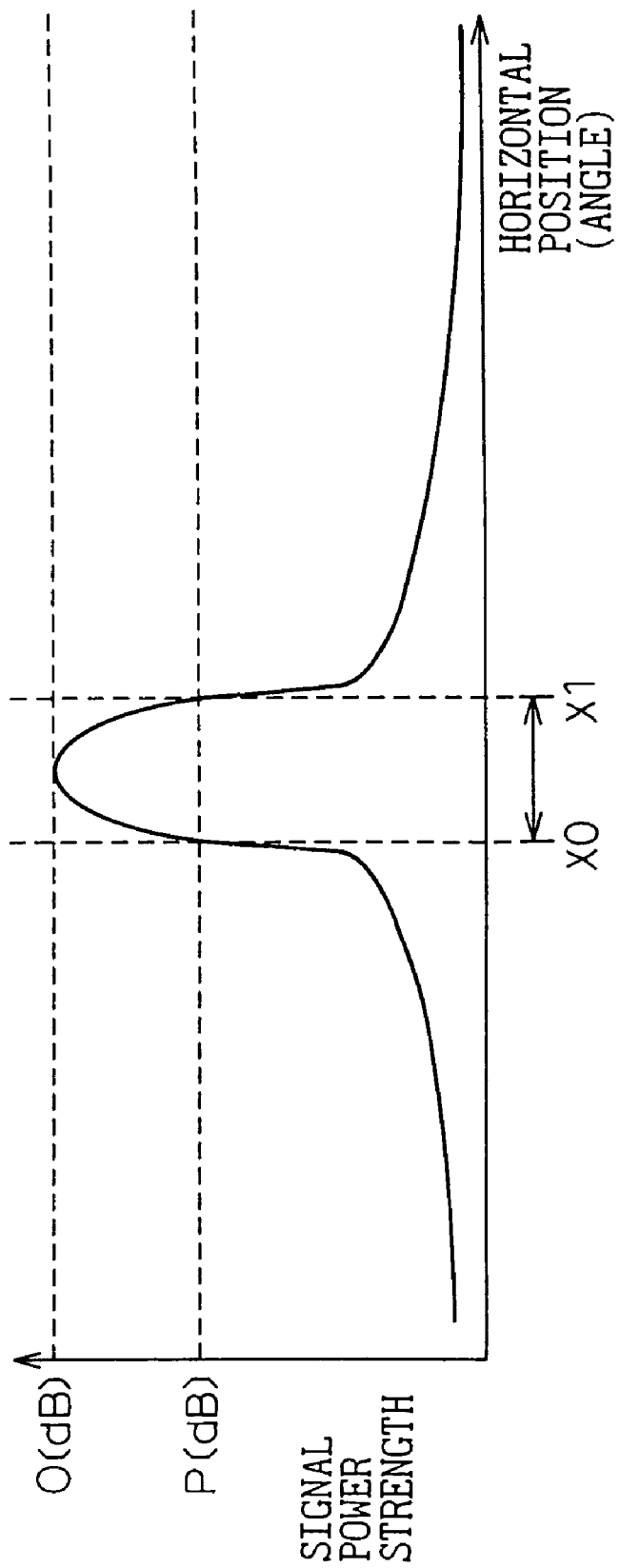
FIG. 9 shows a first method of determining a search area from the signal power strength obtained by the EHF radar of FIG. 7.

In FIG. 8, the interior of a specified area is scanned by the EHF radar 11 in step S1. FIG. 9 shows the result of scanning obtained from the EHF radar 11. In FIG. 9, the abscissa represents the horizontal position (angle) of the area scanned, and the ordinate the power strength in dB. In the case where a preceding vehicle 6 is present, as shown, the signal power strength is high at the horizontal position corresponding to the preceding vehicle 6.

In step S2, an object having a high signal power strength (not less than P dB) is recognized as a target, and the range (X0 to X1) where the target is present is held as a search area. In the case shown in FIG. 3, what is detected as a target is the preceding vehicle 6 alone. Power is not detected from a planar object like the lines 7 drawn on the road surface.

In step S3, the angular range (X0 to X1) obtained in step S2 is defined as a search area in the image acquired from the left and right cameras 12, 13.

In step S4, edges are extracted in the search area thus defined. The processing for extracting vertical edges is well known by those skilled in the art and therefore will not be described herein.

Figure 10:
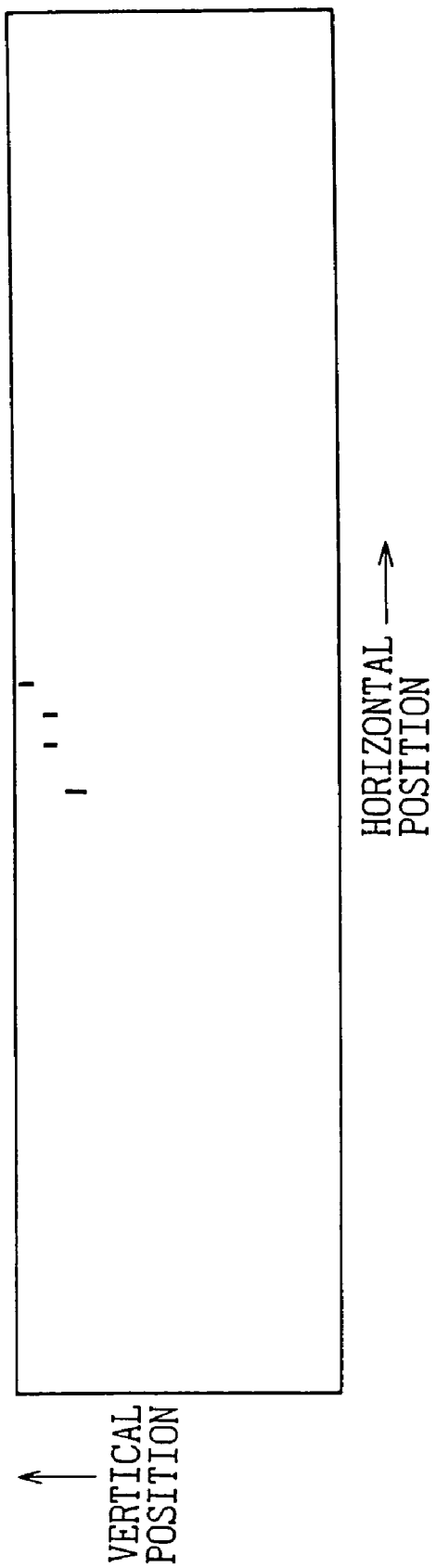
FIG. 10 shows edges extracted by the processing shown in FIG. 8.

In step S5, only edges high in signal power strength are extracted from among the extracted edges. Unlike FIG. 4 showing the result of edge extraction over all the images obtained from the cameras 12, 13, the present embodiment is such that the vertical edges are extracted only for the search area but not over the whole image. The result is as shown in FIG. 10, in which the edges are represented by vertical short lines.

By extracting the vertical edges only within the specified search area in this way, the processing time can be shortened as compared with the case where a target is detected based on the edges of the whole image. Also, the edges are extracted for line 7, etc. (FIG. 3) not included in the search area of FIG. 9, and therefore lines or letters written on the road surface are not erroneously detected as a target.

In step S6, the peaks in the left and right images are matched, and in step S7, the parallax for the corresponding peaks is calculated thereby to obtain the distance to the preceding vehicle 6. The process of steps S6, S7 is well known by those skilled in the art, and therefore will not be described.

In the example described above, the search area is defined for edge extraction by image processing and the processing time can be shortened. Also, objects such as lines or letters on the road surface are not reflected in the signal power of the EHF radar. Thus, only such objects such as an obstacle and a preceding vehicle can be detected, Embodiment 1-2

The detection of the search area in Step S2 of FIG. 8 can be variously modified.

Figure 11:
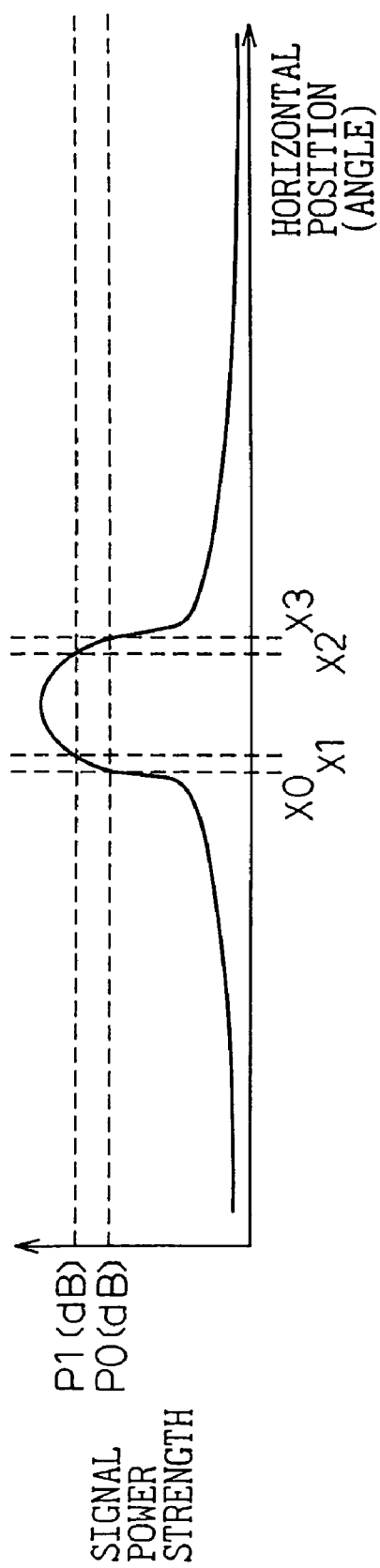
FIG. 11 shows a second method for determining a search area from the strength of the signal power obtained by the EHF radar shown in FIG. 7.
Figure 12:
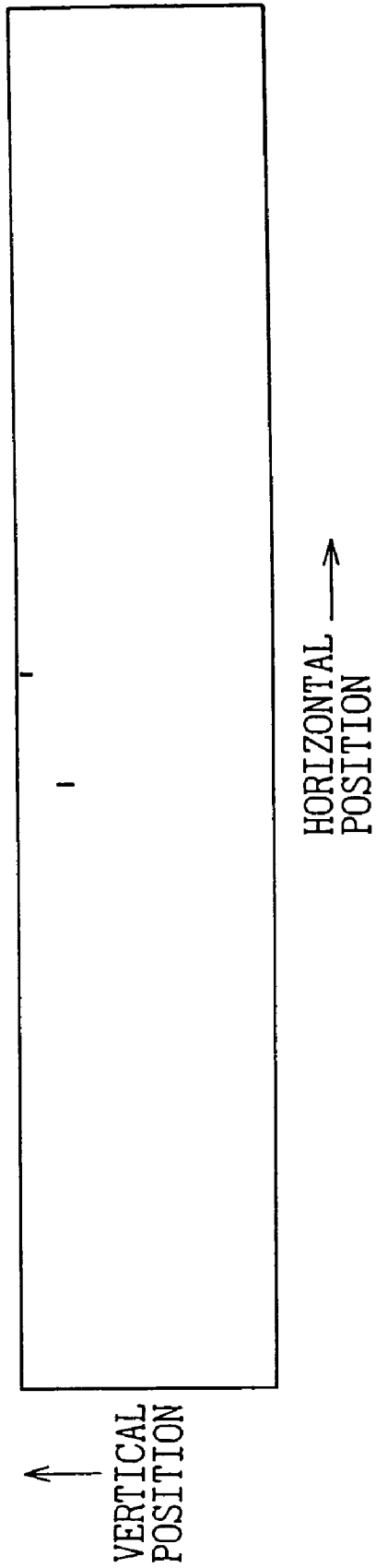
FIG. 12 shows edges extracted by the method shown in FIG. 11.

FIG. 11 shows a different method of extracting the search area in step S2. FIG. 12 shows the result of this edge extraction. In FIG. 11, the range of first level P0 to second level P1 dB of the signal power strength obtained from the EHF radar 11 is defined as a predetermined level range of power strength, and the ranges X0 to X1, X2 to X3 in the particular level range are extracted as a search area. The portion of FIG. 11 where the power strength is high represents the detection of a target. The range of P0 to P1 dB where the signal power strength changes sharply represents the edge position of the target. According to this embodiment, therefore, the position where the edges can probably be extracted can be further limited, and therefore, as shown in FIG. 12, only the edges of the target can be extracted, thereby further shortening the processing time.

Embodiment 1-3

Figure 13:
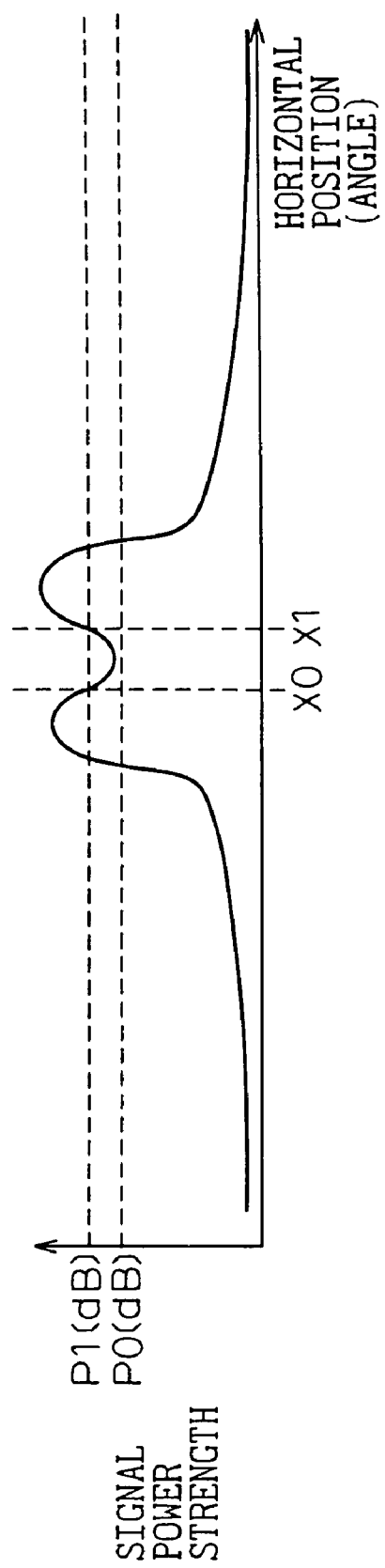
FIG. 13 shows a third method for determining a search area from the strength of the signal power obtained by the EHF radar shown in FIG. 7.
Figure 14:
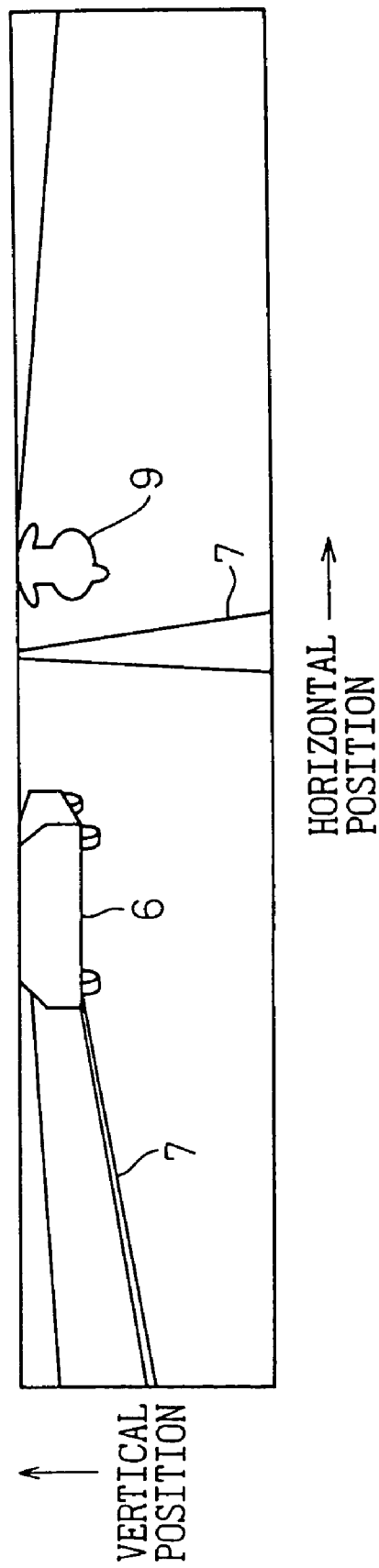
FIG. 14 shows an image of a plurality of preceding vehicles.

FIG. 13 shows another different method of extracting a search area in step S2 of FIG. 8. The distribution of the signal power strength obtained from the EHF radar 11 may be divided into a plurality of peaks as shown in FIG. 13. This phenomenon often occurs when two vehicles 6, 9 are running ahead as shown in FIG. 14. In the case where the power distribution is divided into two peaks as described above, the horizontal positions X0 to X1 of the valley (the portion where the signal power strength is not more than P1 dB) are extracted as a search area.

Embodiment 1-4

When a vehicle is actually running on a toll road or a free way, the possibility of presence of a single preceding vehicle is very low and a plurality of vehicles are running ahead in almost all cases. Therefore, various patterns are obtained in the result of output from the EHF radar and it is impossible to determine a pattern uniquely. In view of this, the actual driving requirement is met by assuming that the total of all the search areas described in embodiments 1-1 to 1-3 constitute a search area.

Embodiment 1-5

Figure 15:
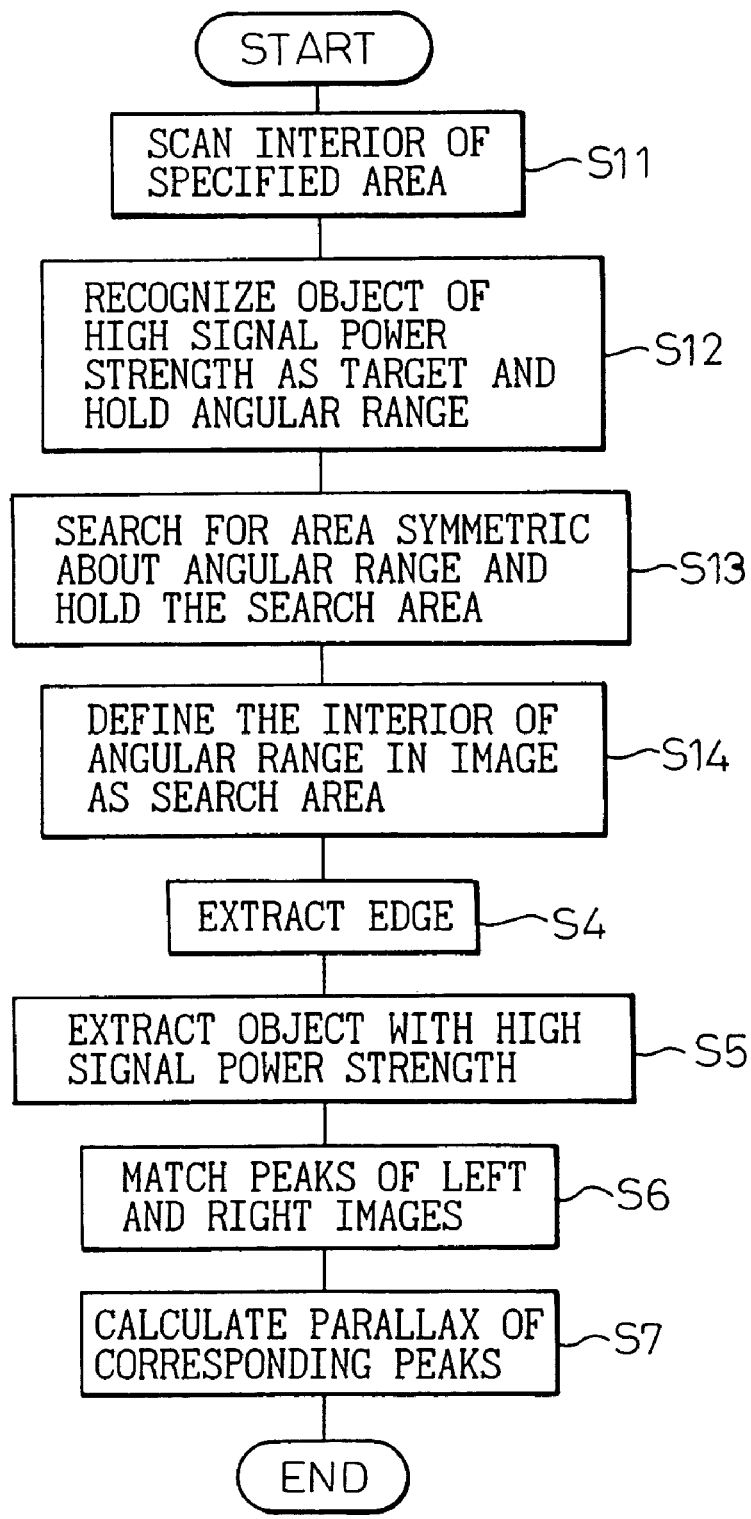
FIG. 15 is a flowchart showing the second processing of the microcomputer of FIG. 7.

FIG. 15 is a flowchart showing the second process in the microcomputer 15.

Figure 16:
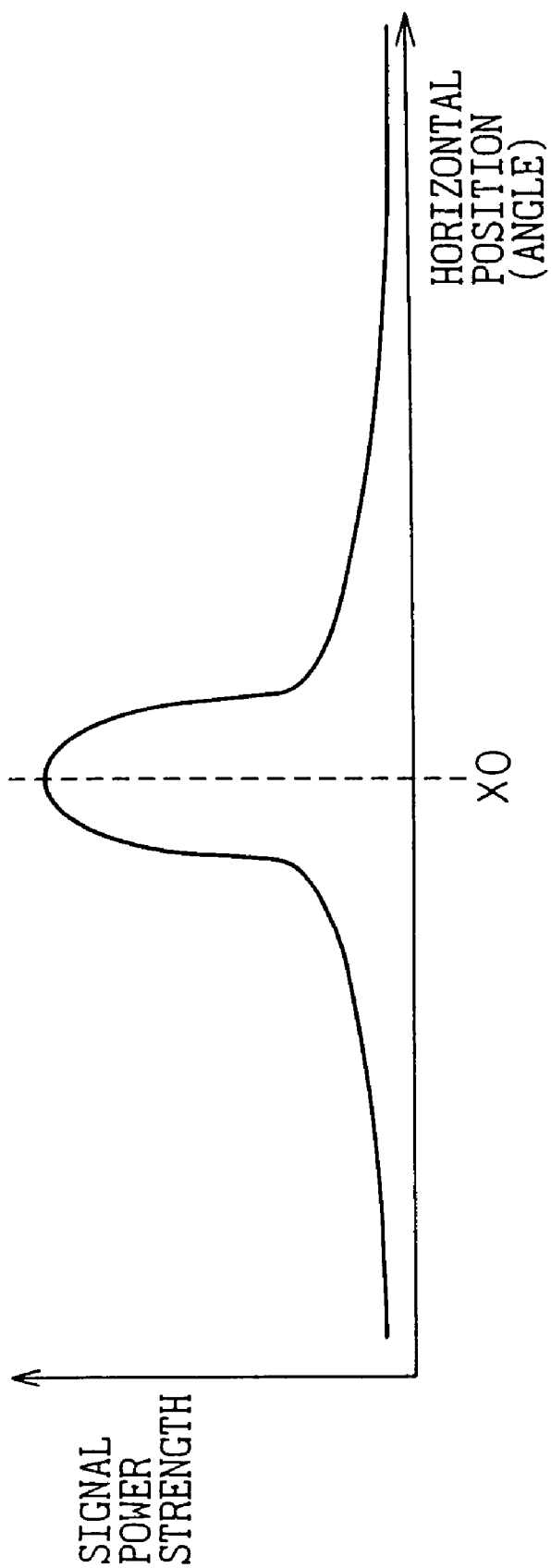
FIG. 16 shows the strength of the power obtained by the EHF radar in the processing shown in FIG. 15.

In step S11, the interior of a specified area is scanned by the EHF radar 11. FIG. 16 shows the result of scanning obtained from the EHF radar 11. Assume that the condition ahead of the vehicle is the same as that shown in FIG. 2.

In step S12, an object with high signal power strength is recognized as a target, and the angle (X0) corresponding to the peak of signal power strength in FIG. 16 is extracted and held.

Figure 17:
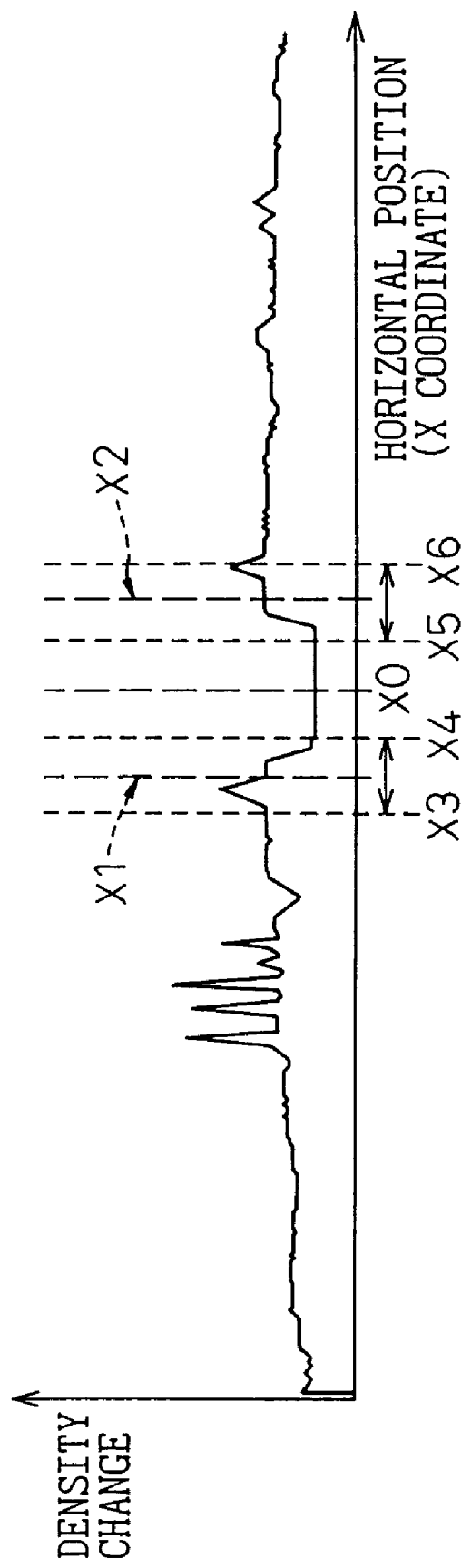
FIG. 17 shows a first method for determining a search area in the process of FIG. 15.

In steps S13, S14, a search area is extracted based on the density change of the image. FIG. 17 shows a density change of the image obtained from the cameras 12, 13. This density change represents the density of the image obtained from the cameras 12, 13, as expressed on a given horizontal line (X coordinate).

In step S13, an area of the density change laterally symmetric about the coordinate X0 corresponding to a peak is searched for, and the positions X1, X2 which have ceased to be symmetric are held. In the case where the target is a vehicle, the image density thereof is laterally symmetric about the center while, outside of the vehicle, the image of the road surface, etc. is detected and therefore is not laterally symmetric. This indicates that a target area is probably located in the neighborhood of the positions X1, X2 where the lateral symmetry has disappeared. In view of the fact that the perfect lateral symmetry cannot be actually obtained even for the same target, however, a certain degree of allowance is given for a symmetry decision.

In step S14, the areas (X3 to X4, X5 to X6) covering several neighboring coordinate points about the positions X1, X2 are held as a search area. In this way, the area in the vicinity of the positions X1, X2 is specified to show that the edges of a target are present in the particular search area.

The processes in subsequent steps, i.e. steps S4 to S7 using this search area are similar to that in the flowchart of FIG. 8 described above. Also in this embodiment, the time required for image processing is shortened, and letters on the road surface are prevented from being detected erroneously as a target.

Embodiment 1-6

The aforementioned extraction of a search area by image processing in steps S13, S14 described above can use a density projection value instead of a density change of the image.

Figure 18:
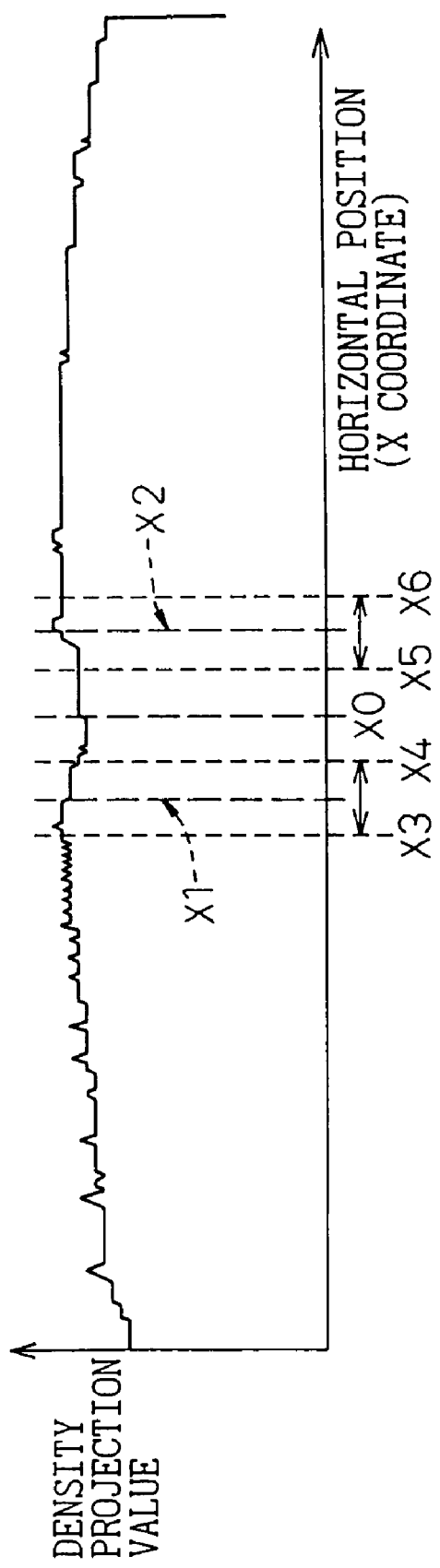
FIG. 18 shows a second method for determining a search area in the process of FIG. 13.

FIG. 18 shows a method of extracting a search area using the density projection value of an image. The density projection value is obtained by totaling the pixel densities in vertical direction for the images obtained from the cameras 12, 13. In this embodiment, too, the search areas X3 to X4, X5 to X6 are obtained in a similar manner to the aforementioned embodiment 2-1.

Embodiment 1-7

Figure 19:
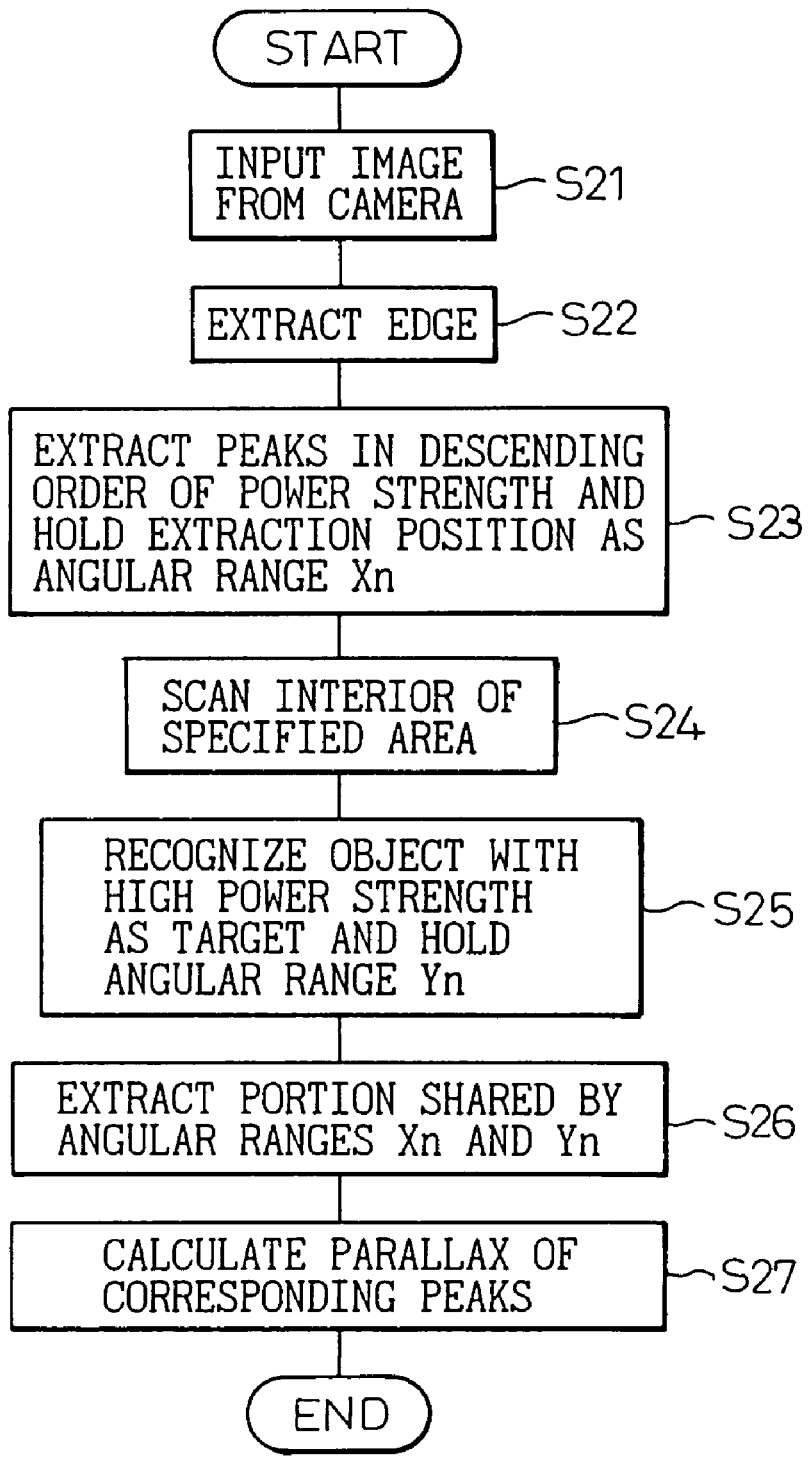
FIG. 19 is a flowchart showing the third processing of the microcomputer of FIG. 7.

FIG. 19 is a flowchart showing the third process in the microcomputer 15 of FIG. 7. In step S21, an image is acquired from the cameras 12, 13.

In step S22, edges are extracted by image processing. In this image processing, edges are extracted over the entire range of the image, and therefore the result as shown in FIG. 4 described above is obtained.

From the edges obtained, peaks are extracted in the descending order of power strength in step S23. The result is as shown in FIG. 5. The extraction position for each edge is held as an angular position Xn.

In step S24, the interior of the specified area is scanned by the EHF radar 11. In step S25, the angular position Yn is extracted and held from the result of scanning. This angular position Yn is similar to the one extracted as a search area in embodiments described above, and any of the methods shown in FIGS. 9, 11 and 13 or a given combination thereof can be used, In step S26, a portion shared by the angular positions Xn and Yn is extracted. In step S27, the parallax is determined for the target at the common angular position extracted, and by converting it into a distance value, a target is detected.

In embodiment 1-7, the time required for image processing is not shortened, but the measurement error due to letters or other obstacles on the road surface can be eliminated.

Embodiment 2

Figure 20:
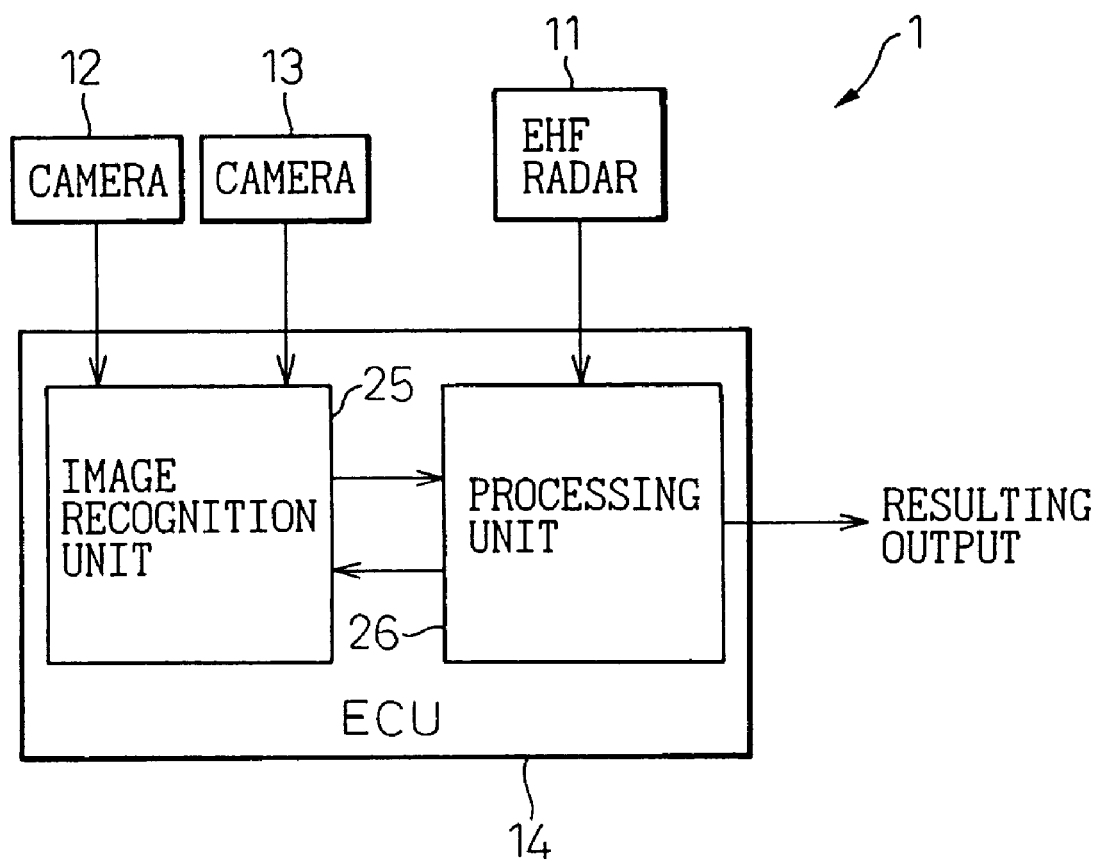
FIG. 20 is a vehicle target detection apparatus according to a second embodiment of the invention.

FIG. 20 shows a target detection system for a vehicle according to a second embodiment of the invention.

This vehicle target detection system comprises an EHF radar 11, a left camera 12, a right camera 13 and an ECU 14. The ECU 14 includes an image recognition unit 25 for processing the images input from the two cameras 12, 13 and outputting edge data and a processing unit 26 for detecting the presence of and measuring the distance to a target by fusion processing of the edge data input from the EHF radar 11 and the image recognition unit 25.

The configuration described above is similar to that of the conventional target detection system. Unlike in the conventional target detection system in which the result is output unidirectionally only from the image recognition unit 25 to the processing unit 26, however, the target detection system shown in FIG. 20 is different from the conventional target detection system in that bidirectional communication is sometimes established between the processing unit 26 and the image recognition unit 25.

The EHF radar 11 radiates an EHF forward of the vehicle, and detects the presence of and the distance to a target based on the radio wave reflected from the target. The EHF radar 11, which has a low accuracy of distance measurement for a near target, outputs a near flag upon detection of a near target. The near flag is output in temporally stable state in the case where a target is located very near (not farther than 5 m, for example), and output intermittently in unstable state in the case where a near target is present (about 5 m to 10 m). In the case where a target is located far (not less than 10 m), on the other hand, no near flag is output.

Figure 21:
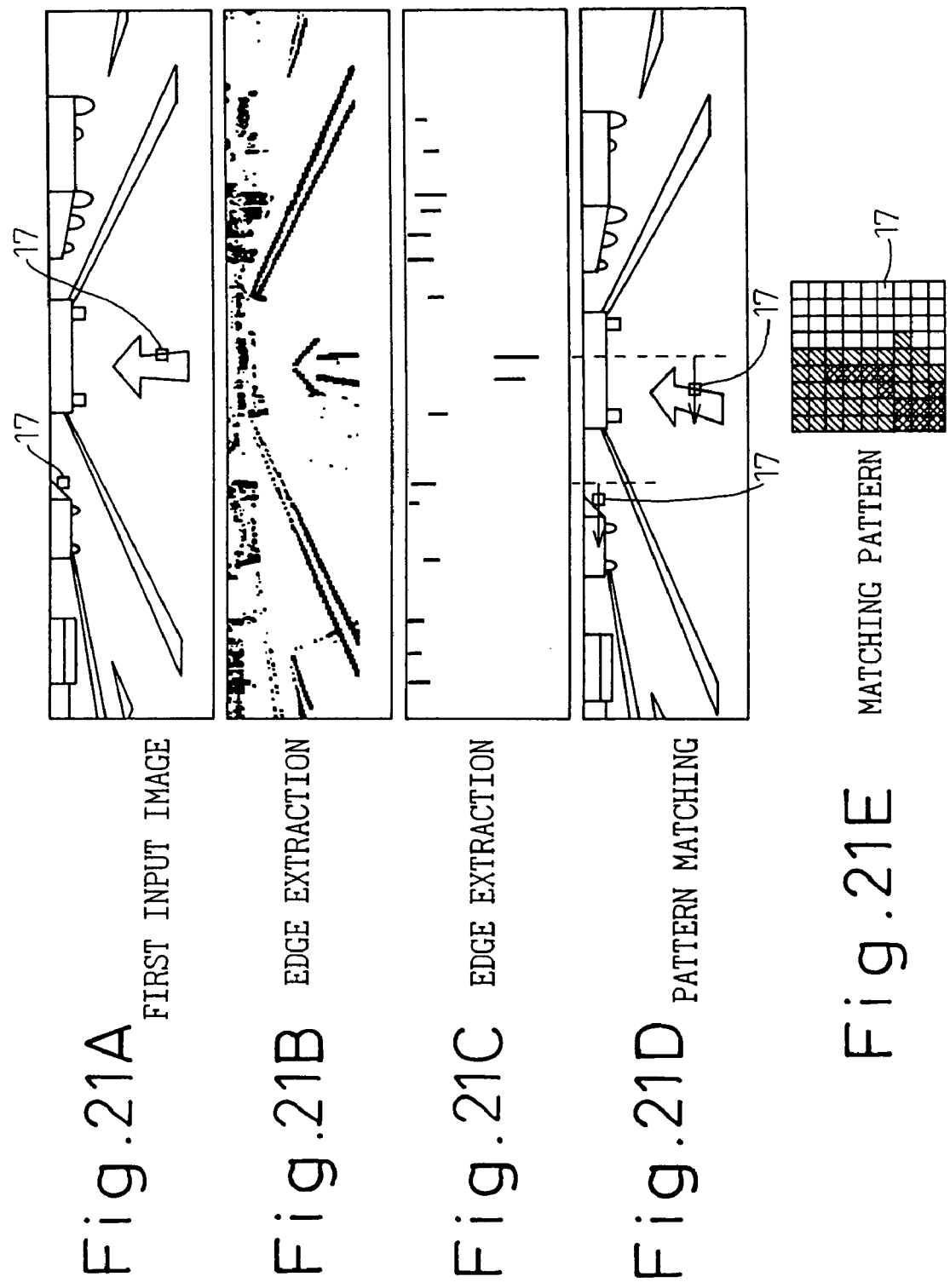
FIGS. 21A to 21E are diagrams for explaining the processing in the image recognition unit of FIG. 20.

The processing in the image recognition unit 25 will be explained with reference to FIGS. 21A to 21E. First, the image recognition unit 25 extracts the edges of an input image (FIG. 21A) of the camera 12. As a result, the edges shown in FIG. 21B are obtained. Then, from the result of this edge extraction, N (say, 16) edges are extracted in the descending order of strength (FIG. 21C).

From each of the N edges, a matching pattern 17 including M×M (say, 9×9) pixels is retrieved as shown in FIG. 21E, and the pattern matching is effected for the input image (FIG. 21D) from the other camera 13 thereby to detect corresponding edges. From the parallax between the two edges, the distance to each edge is calculated and the result is output to the processing unit 26 as edge data.

As shown also in FIG. 21B, the image recognition unit 25 may erroneously output a distance by extracting also the edges for the density difference of white lines and other objects other than the target which are not three-dimensional. Also, the distance may be erroneously measured by a mis-operation in the case where the matching area happens to include a pattern similar to the pattern 17 as large as M×M pixels used for pattern matching as shown in FIG. 21E.

Figure 1:
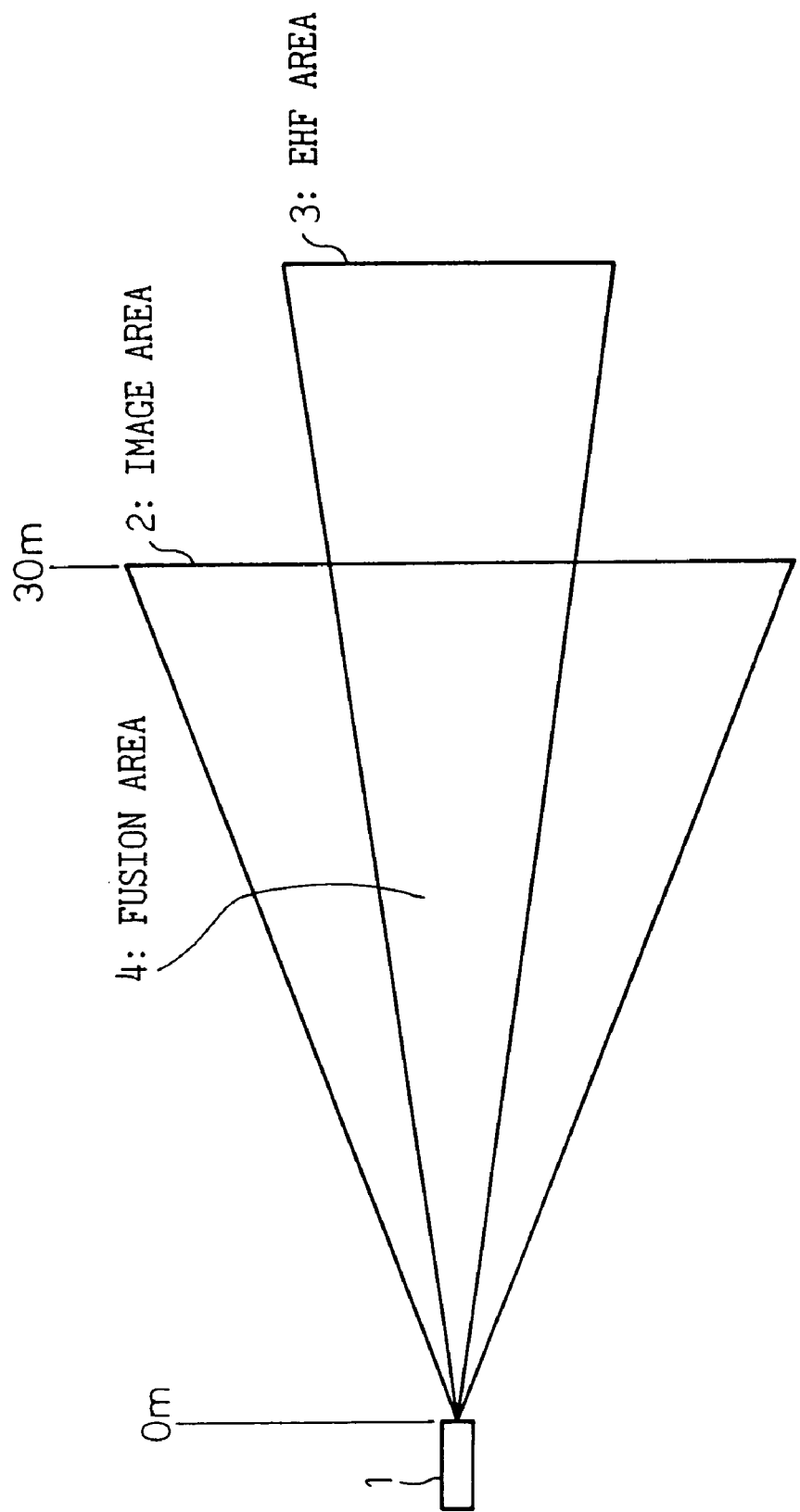
FIG. 1 shows different detection areas defined for a target detection system mounted on an automotive vehicle.

In view of this, according to this invention, the near flag output from the EHF radar 11 and the letter flag and the road surface flag output from the image recognition unit 25 are used so that the recognition error and the distance measurement error of the image recognition system for the fusion area 4 (FIG. 1) are prevented before the fusion processing in the processing unit 26.

Embodiment 2-1

Figure 22:
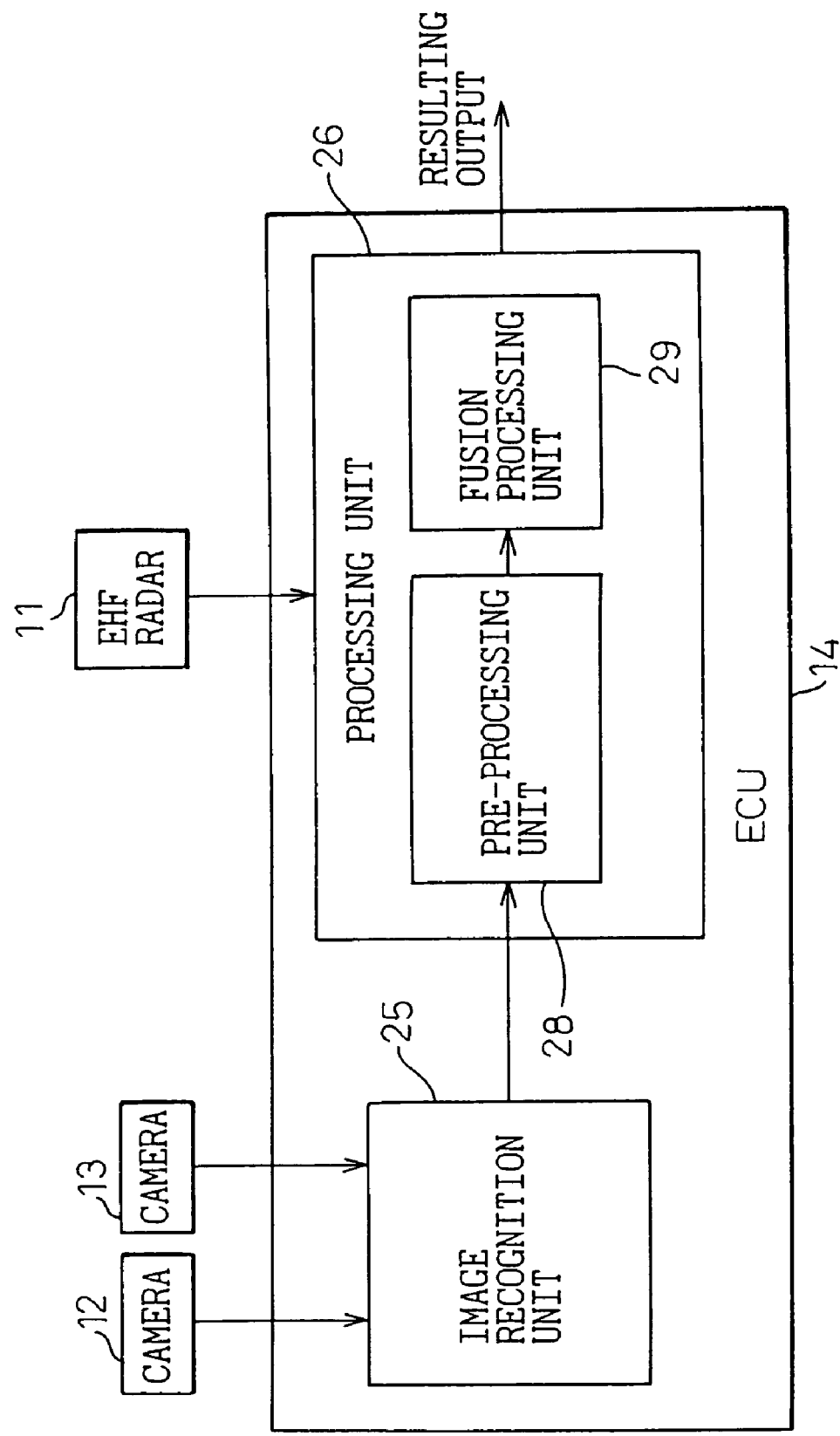
FIG. 22 shows a first specific circuit configuration of a target detection system according to a second embodiment.

FIG. 22 shows a first specific configuration of a vehicle target detection system. The component parts that have already been explained with reference to FIG. 20 will not be explained again.

When edge data is output from the image recognition unit 25, the pre-processing unit 28 of the processing unit 26 selects the edge data by the near flag output from the EHF radar 11. The edge data determined as effective are employed and output to the fusion processing unit 29.

Figure 23:
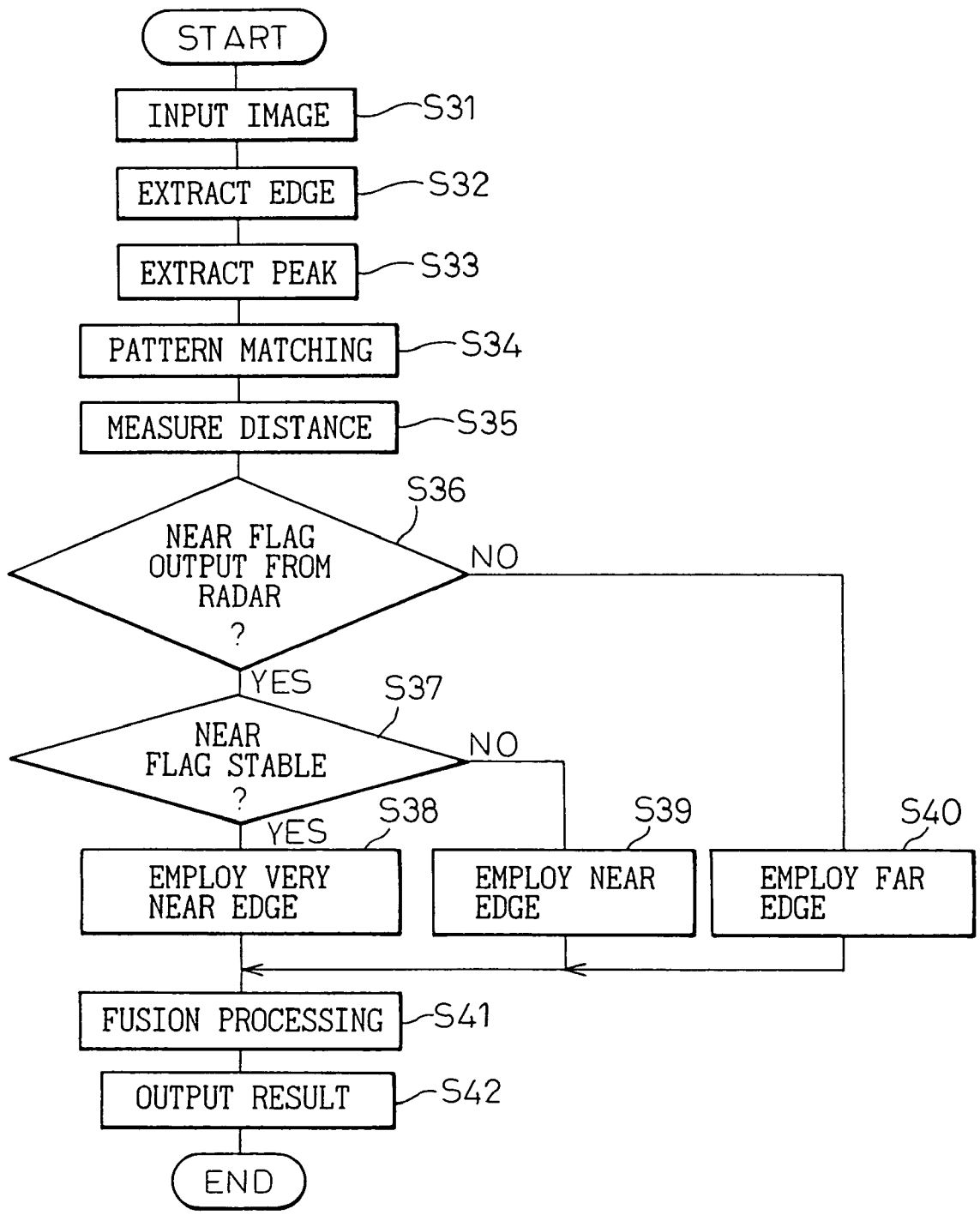
FIG. 23 is a flowchart showing the operation of the system of FIG. 22.

This processing will be explained in detail with reference to the flowchart of FIG. 23.

The image recognition unit 25 is supplied with images from the cameras 12, 13 (step S31) and extracts the edges from one of the images (step S32). From the edges thus extracted, a predetermined number of edges having a strong peak are extracted (step S33). The pattern matching for the other image is carried out for each edge (step S34) thereby to measure the distance (step S35).

The pre-processing unit 28 of the processing unit 26 determines whether the near flag is output from the EHF radar 11 (step S36), and if any is output, determines whether the near flag is output in stable fashion (step S37)

In the case where it is determined that the near flag is output in stable fashion (continuously temporally), it is determined that a target is present at a very near distance (say, 0 to 5 m), and the edge data having distance information of a very near distance (say, not more than 5 m) is employed (step S38). In the case where it is determined that the near flag is output in unstable fashion (intermittently), on the other hand, it is determined that a target is located at a near distance (say, 5 to 10 m), and the edge is employed which has distance information on a near distance (say, 5 to 10 m) (step S39). Further, in the case where the near flag is not output, it is determined that a target is located far (say, not less than 10 m), so that the edges having far distance (say, not less than 10 m) information in the fusion area 4 are employed (step S40).

In the fusion processing unit 29, the fusion processing is executed based on the edge data employed and the data output from the EHF radar 11 thereby to recognize the presence of a target and measure the distance to the target (step S41), followed by outputting the result (step S42).

According to this embodiment, even in the case where the edge data is recognized erroneously or the distance is measured erroneously by the image recognition unit 25, the particular edge data is eliminated unless a target is detected by the EHF radar 11 in the area of erroneous distance measurement. Thus, erroneous recognition or erroneous distance measurement for the target can be prevented. Also, invalid edge data is removed before the fusion processing and, therefore, the processing time can be shortened.

Embodiment 2-2

Figure 24:
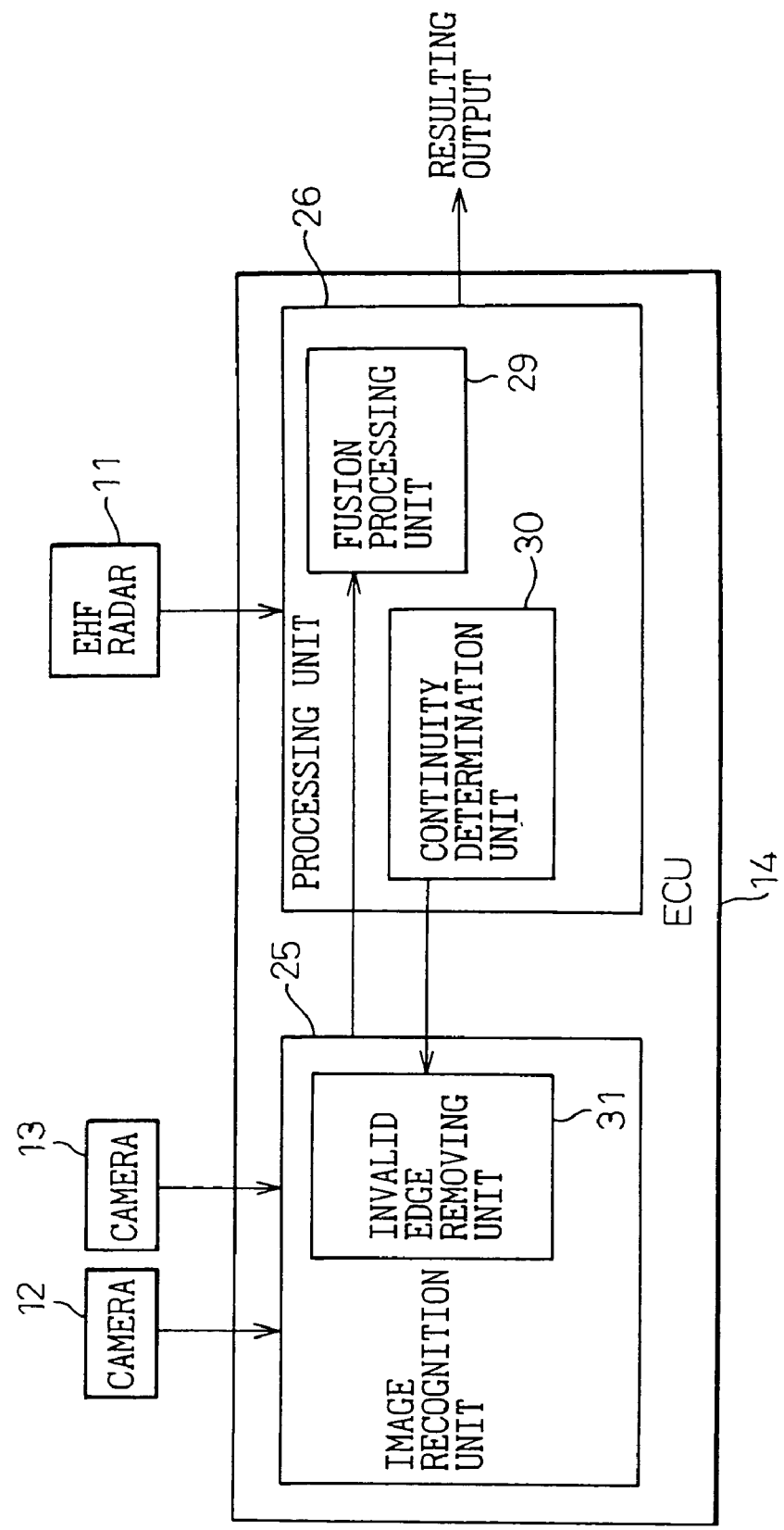
FIG. 24 shows a second specific circuit configuration of a target detection system according to the second embodiment.

FIG. 24 shows a second specific circuit configuration of a vehicle target detection system according to a second embodiment. The component parts already explained will not be explained again.

The continuity determination unit 30 of the processing unit 26 determines the state of the near flag output from the EHF radar 11, and the resulting data is sent to the invalid edge removing unit 31 of the image recognition unit 25. In the invalid edge removing unit 31, invalid edge data are removed in accordance with the condition of the near flag and the edge data is output to the fusion processing unit 29.

Figure 25:
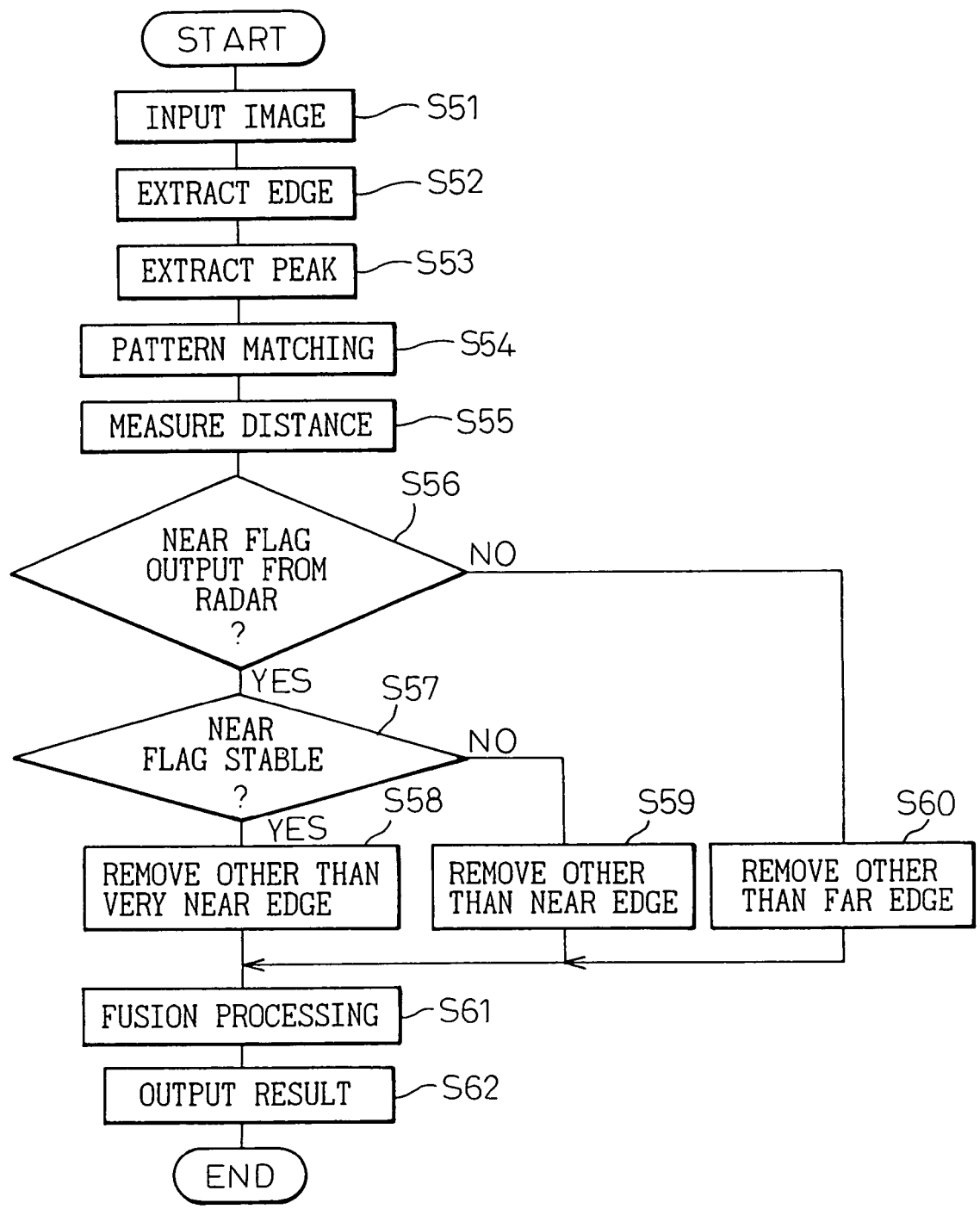
FIG. 25 is a flowchart showing the operation of the system of FIG. 24.

The aforementioned process will be explained in detail with reference to the flowchart of FIG. 25.

In the image recognition unit 25, as in steps S31 to S33 in the embodiment 2-1 described above, the image is input (step S51), the edges are extracted (step S52) and the peak is extracted (step S53).

The image recognition unit 25, as in steps S34, S35 in the aforementioned embodiment, conducts pattern matching using the edge data not removed (step S54) and measures the distance (step S55).

Then, as in steps S36, S37 in the embodiment 2-1 described above, the continuity determination unit 30 determines whether the near flag is output or not from the EHF radar 11 (step S56) and also whether the near flag is in stable state or not (step S57), the result thereof being output to the invalid edge removing unit 31.

In the case where the near flag is output in stable fashion, the invalid edge removing unit 31 removes the edge data having other than the very near distance information (step S58). Upon receipt of the data indicating that the near flag is output in unstable fashion, on the other hand, the edges having other than the near distance information are removed (step S59). Further, in the case where no near flag is output, the edge data having other than far distance information are removed (step S60).

The resulting edge data is output to the fusion processing unit 29. In the fusion processing unit 29, as in steps S41, S42 of the embodiment 2-1 described above, the fusion processing is carried out (step S61) and the result is output (step S62).

This embodiment also produces the same effect as the embodiment 2-1 described above.

Embodiment 2-3

Figure 26:
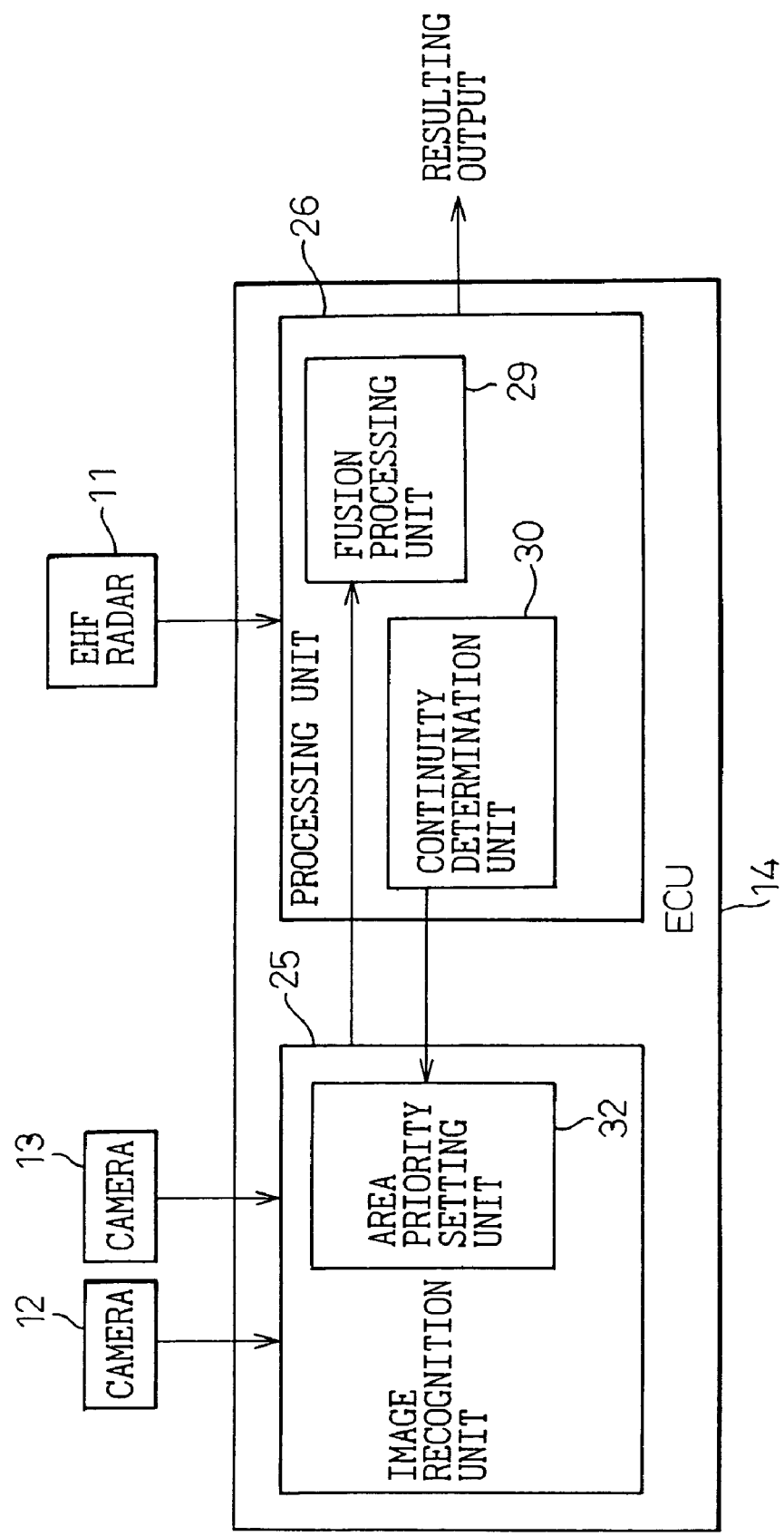
FIG. 26 shows a third specific circuit configuration of a target detection system according to the second embodiment.

FIG. 26 shows a third specific circuit configuration of a vehicle target detection system according to a second embodiment. The component parts already explained will not be explained again.

The continuity determination unit 30 of the processing unit 26 determines the state of the near flag output from the EHF radar 11, and sends the result data to the image recognition unit 25. In the image recognition unit 25, an area priority setting unit 32 determines the order of priority of the pattern matching areas corresponding to the input result data, and performs the pattern matching for the selected area in priority.

Figure 27:
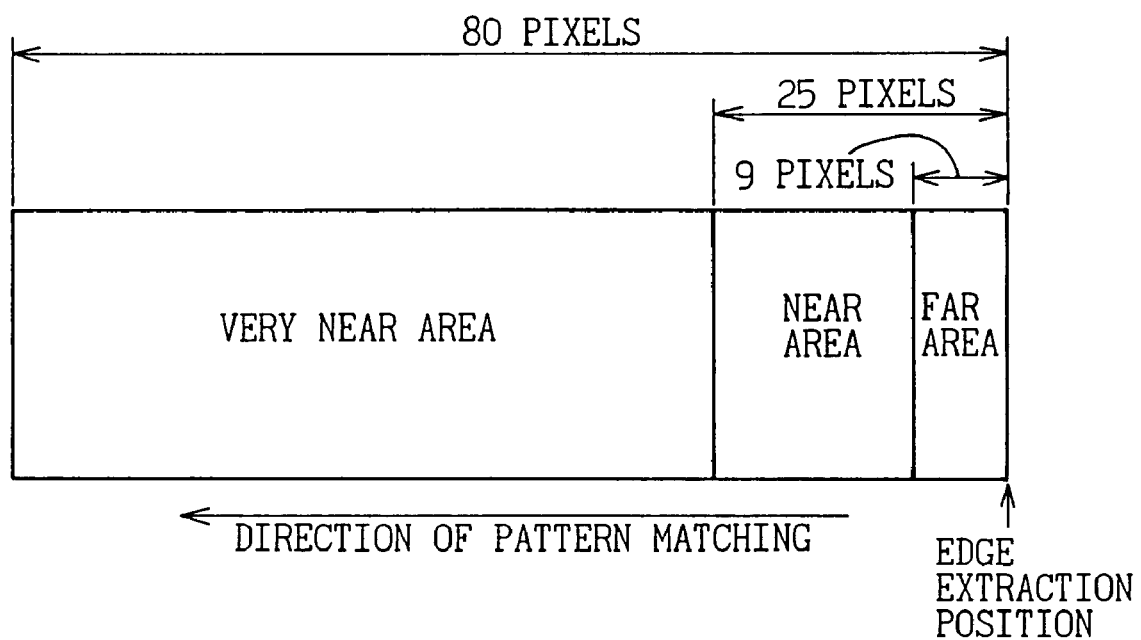
FIG. 27 shows a pattern matching area in FIG. 26.

FIG. 27 shows areas for which the pattern matching is conducted.

Upon extraction of the edges from one of the images, as shown in FIG. 21A, a matching pattern corresponding to the edge portion is taken out and, as shown in FIG. 21D, the pattern matching is carried out for the other image. In the process, based on the data input from the continuity determination unit 30, the order of priority of areas is determined according to the edge extraction position.

The image recognition unit 25, upon receipt of the data indicating that a near flag is stably output, performs the pattern matching for the area of the 26th to 80th pixels from the edge extraction position as a very near area in priority over the other areas. Upon receipt of the data indicating that the near flag is output in an unstable fashion, on the other hand, the image recognition unit 25 performs the pattern matching for the area of the 10th to 25th pixels, for example, in priority as a near area. Further, upon receipt of the data indicating that no near flag is output, the image recognition unit 25 performs the pattern matching for the area of the 0th to the 9th pixels, for example, in priority as a far area.

Figure 28:
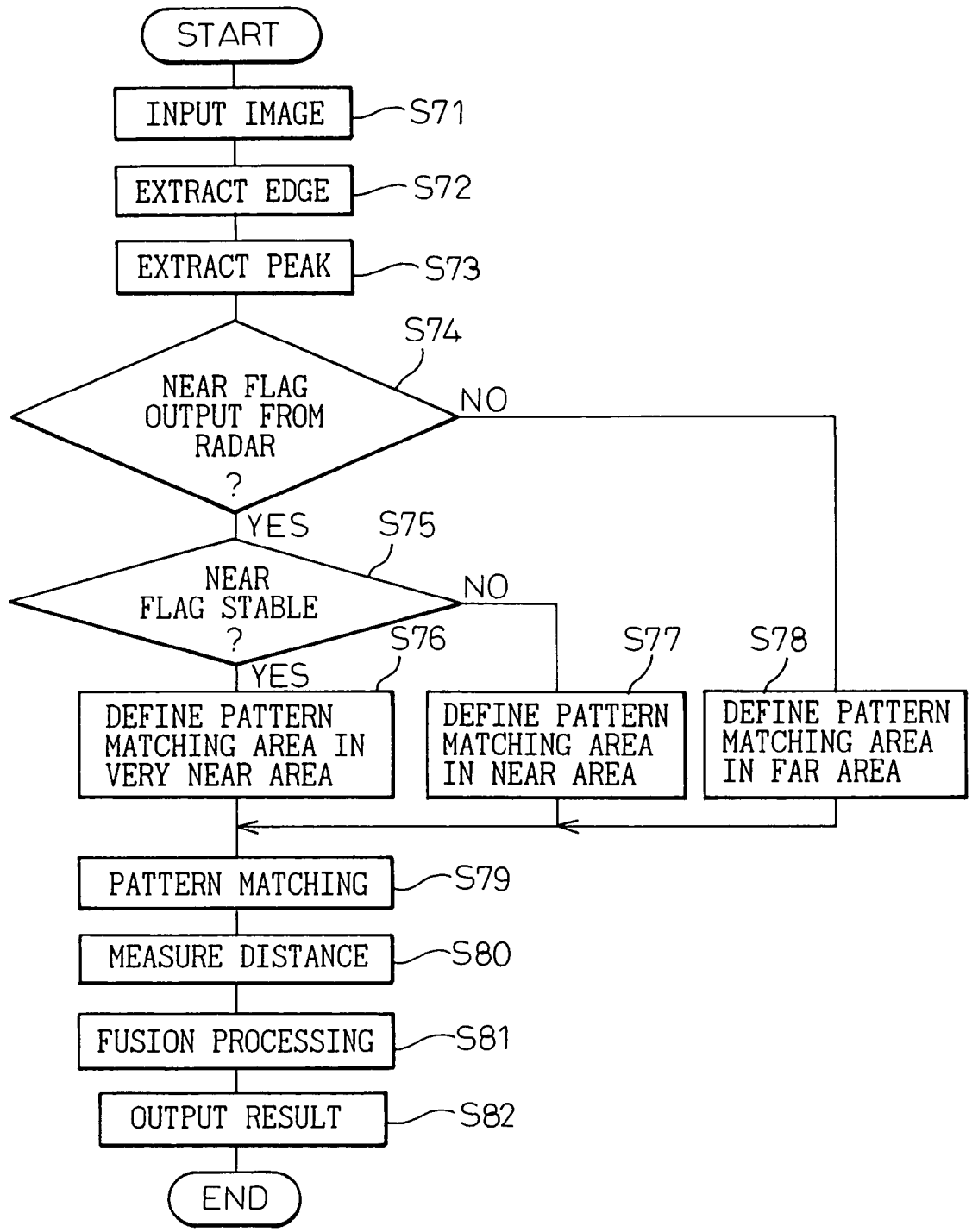
FIG. 28 is a flowchart showing the operation of the system of FIG. 27.

The aforementioned processing will be explained in detail with reference to the flowchart of FIG. 28.

In the image recognition unit 25, an image is input (step S71), edges are extracted (step S72) and a peak is extracted (step S73), and the continuity determination unit 30 determines whether the near flag is output or not (step S74) and whether the near flag is stable or not (step S75). The result is output to the edge priority setting unit 32.

In the case where the near flag is output in a stable fashion, the edge priority setting unit 32 gives the priority to the very near distance for the pattern matching area (step S76). Upon receipt of the data indicating that the near flag is output in an unstable fashion, on the other hand, the near distance is given priority (step S77). Further, in the case where no near flag is output, the far distance is given priority (step S78).

The image recognition unit 25 performs the pattern matching (step S79) and measures the distance (step S80) for the area given priority. The resulting edge data is output to the fusion processing unit 29.

In the fusion processing unit 29, as in steps S41 and S42 of the embodiment 2-1 described above, the fusion processing is carried out (step S81) and the result is output (step S82).

According to this embodiment, the pattern matching is started from the area mostly likely to match, and therefore the time until successful matching is shortened. Also, the possibility of handling a similar matching pattern is reduced thereby to prevent the erroneous distance measurement.

Embodiment 2-4

Figure 29:
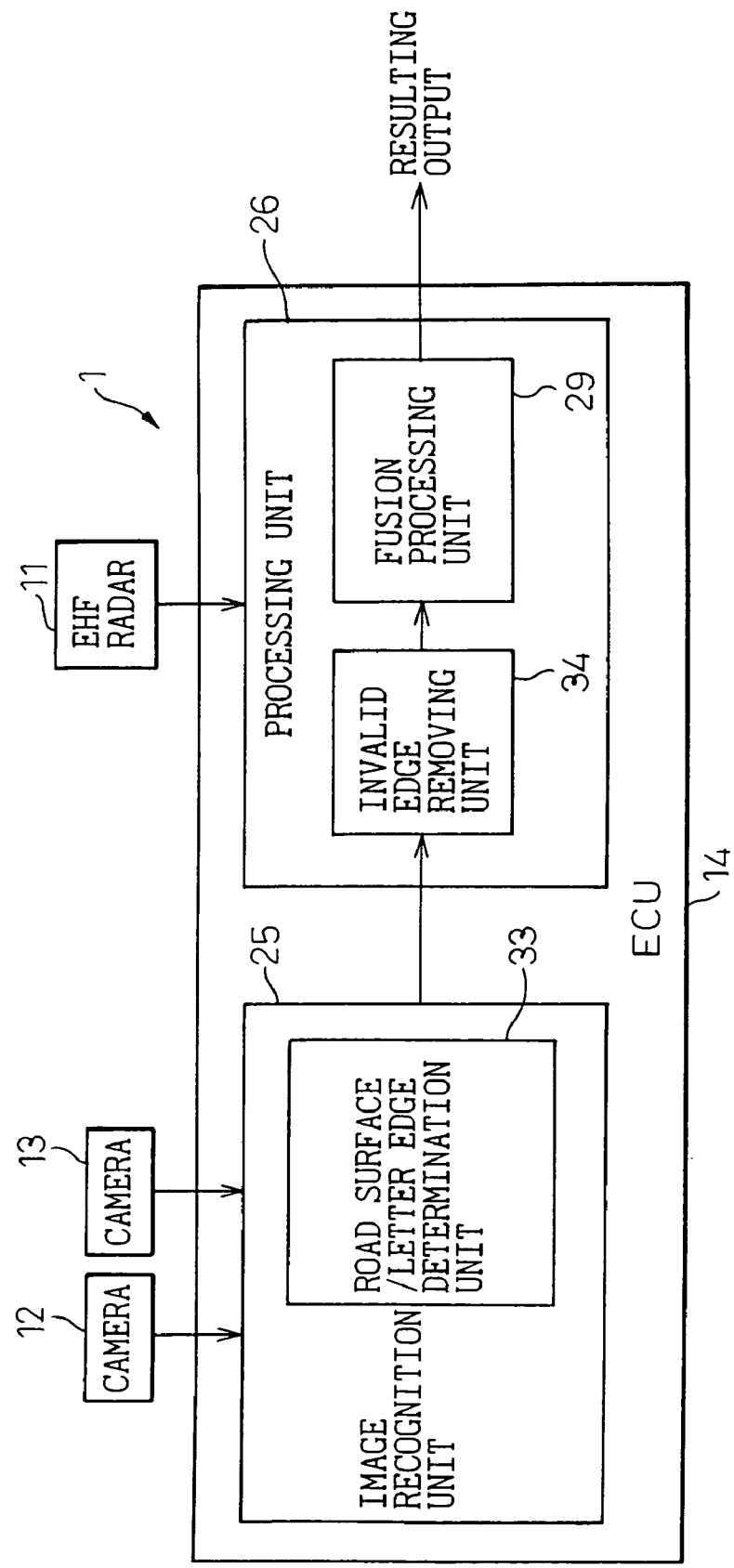
FIG. 29 shows a fourth specific circuit configuration of a vehicle target detection system according to the second embodiment.

FIG. 29 shows a fourth specific circuit configuration of a vehicle target detection system according to the second embodiment. The component parts already explained will not be explained again.

A road surface/letter edge determination unit 33 of the image recognition unit 25 determines whether an extracted edge represents a line or a letter on the road surface or not, and outputs the result to the invalid edge removing unit 34 of the processing unit 26. The invalid edge removing unit 34 removes the invalid edges from the edge data input thereto from the image recognition unit 25, and outputs the remaining edge data to the fusion processing unit 29.

In the image recognition unit 25, the edges are extracted according to the density difference on the image. Thus, the edges of the letters and shadows on the road surface, though not a target, are extracted undesirably according to the density difference.

The road surface/letter edge determination unit 33 determines whether the density difference on the road surface or a target is involved or not, based on the distance information and height information on the density difference extracted. In the case where it is determined that the density difference is that on the road surface, the edge data corresponding to the particular density difference with the road surface flag attached thereto is output to the invalid edge removing unit 34.

The letters written on the road surface change from the road surface color to white or yellow or from white or yellow to the road surface color in the vicinity of the edge thereof. The road surface/letter edge determination unit 33, in any of the changes mentioned above, determines that the road surface letters are detected, using the density information in the neighborhood of the extracted edge. Upon determination that the road surface letters are involved, the road surface letter determination unit 33 outputs the edge with a letter flag attached thereto to the invalid edge removing unit 34.

In the case where the road surface flag or the letter flag is attached to the edge data and the distance information indicates the near distance (say, not more than 10 m), the invalid edge removing unit 34 determines whether there is a near flag output from the EHF radar 11. Unless the near flag is output, the particular edge is determined as the density difference or the letters on the road surface and removed, while the remaining edge data are output to the fusion processing unit 26.

Figure 30:
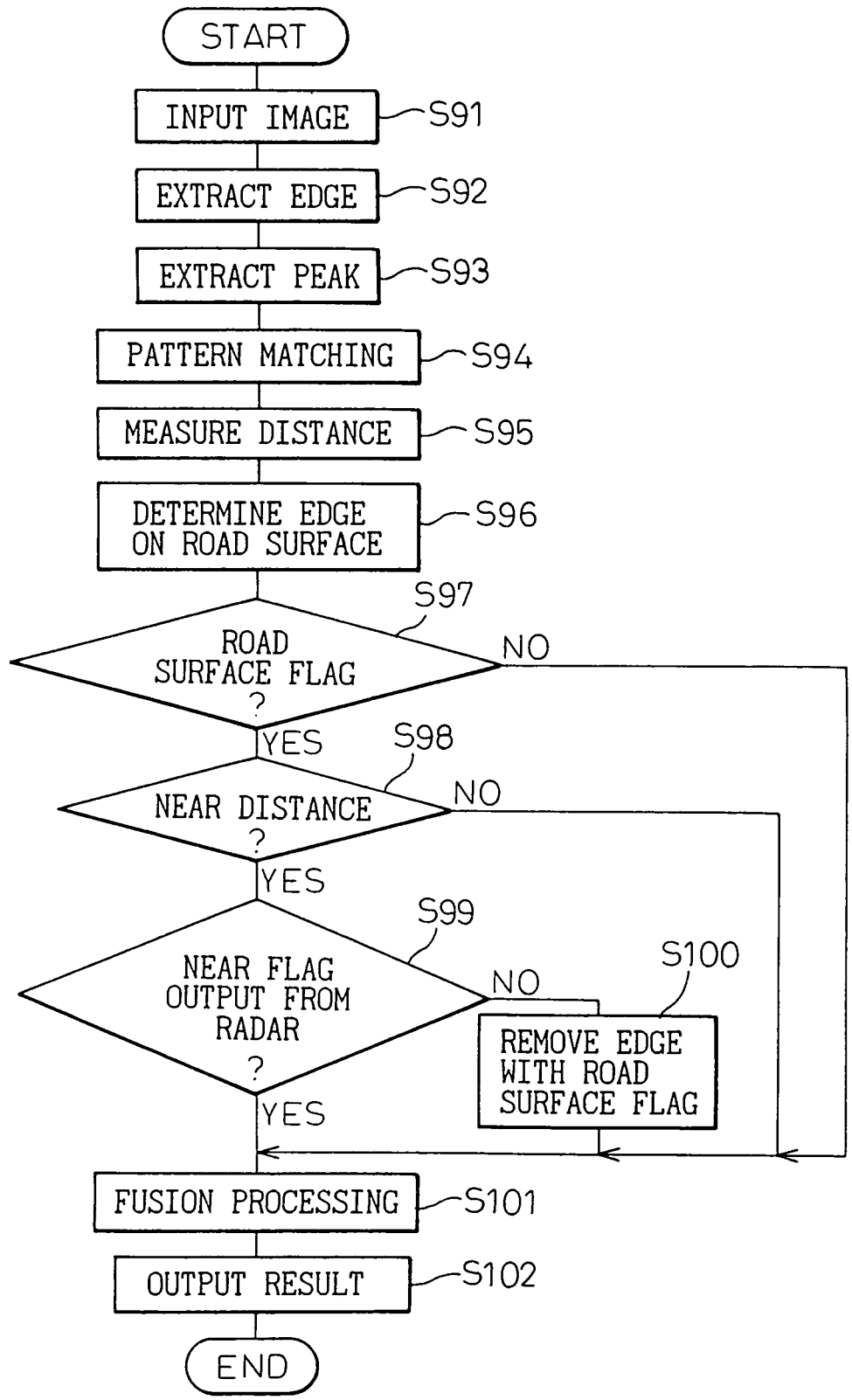
FIG. 30 is a flowchart showing the first operation of the system of FIG. 29.

The aforementioned process will be explained in detail with reference to the flowchart of FIG. 30.

In the image recognition unit 25, as in steps S31 to S35 of the embodiment 2-1 described above, an image is input (step S91), edges are extracted (step S92), a peak is extracted (step S93), the pattern matching is carried out (step S94), and the distance is measured (step S95). By using the technique mentioned above, the road surface flag or the letter flag is attached to a predetermined edge data (step S96).

The invalid edge removing unit 34 determines whether the road surface flag or the letter flag exists or not (step S97), determines whether the edge distance information indicates a near distance or not (step S98), and determines whether the near flag is output or not from the EHF radar 11 (step S99). In the case where the road surface flag or the letter flag is attached, the edge distance information indicates the near distance and the near flag is not output, then the edge data of the road surface flag or the letter flag, as the case may be, is removed (step S100), and the remaining edge data is delivered to the fusion processing unit 29.

In the fusion processing unit 29, as in steps S41 and S42 of the embodiment 2-1 described above, the fusion processing is carried out (step S101) and the result is output (step S102).

The embodiment 2-4 can be modified in the following way.

The road surface/letter edge determination unit 33 may output only the road surface flag from the distance and height of the density difference of the road surface or, conversely, may output only the letter flag from the change in the density difference of the road surface.

Figure 31:
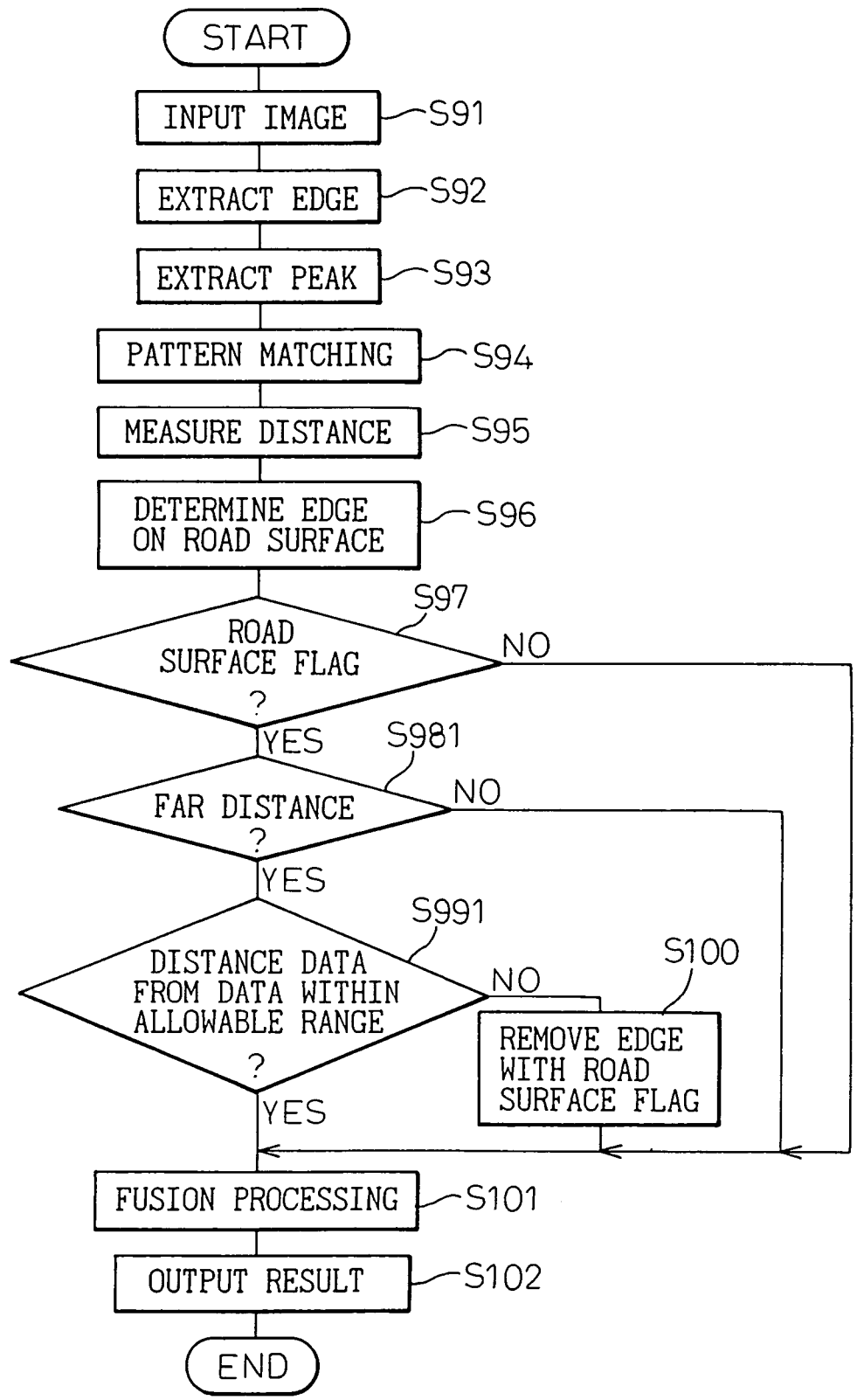
FIG. 31 is a flowchart showing the second operation of the system of FIG. 29.

Also, the process can be changed as shown in the flowchart of FIG. 31. Specifically, the invalid edge removing unit 34 determines whether the road surface flag or the letter flag is attached to the edge data or not and also determines in step S981 whether the distance information indicates a far distance (say, not less than 10 m). In the case where the distance information indicates a far distance, it is determined in step S991 whether the distance data output from the EHF radar 11 is within the allowable error range of the distance information of the edge data. In the case where it is not within the allowable error range, the edge data to which the road surface flag or the letter flag is attached is removed in step S100.

According to this embodiment, the erroneous recognition and the erroneous distance measurement in the image recognition system can be prevented before the fusion processing by use of the letter flag and the road surface flag of the image recognition system.

What is claimed is:

1. A target detection system comprising:
   a radar for scanning an interior of a specified area by radiating a radio wave, for outputting target data responsive to a target being detected in the specified area based on receipt of a reflected wave, for outputting a flag in a first state in response to the target being detected in a first distance range, for outputting the flag in a second state in response to the target being detected in a second distance range, and for outputting no flag in response to the target being detected in a third distance range;
   an image acquisition unit for acquiring an image of the specified area and outputting corresponding image data;
   an image recognition unit for outputting edge data by processing the image data output from said image acquisition unit; and
   a processing unit for selecting the edge data associated with a distance in the first distance range in response to the flag being output in the first state, for selecting the edge data associated with a distance in the second distance range in response to the flag being output in the second state, and for selecting the edge data associated with a distance in the third distance range in response to no flag being output, and for detecting the target based on the selected edge data and the target data output from said radar.

2. The target detection system according to claim 1, wherein:
   said image acquisition unit is equipped with two cameras;
   said image recognition unit extracts the edges of input images from said two cameras and generates distance information by calculating a distance to each edge from a parallax between two of the edges.

3. The target detection system according to claim 1, wherein: said first distance range is 0 to 5 m, said second distance range is 5 to 10m, and said third distance range is more than 10 m.

4. The target detection system according to claim 1, wherein:
   said processing unit is configured to remove the edge data associated with a distance in the second distance range and the edge data associated with a distance in the third distance range in response to the flag being output in the first state, is configured to remove the edge data associated with a distance in the first distance range and the edge data associated with a distance in the third distance range in response to the flag being output in the second state, and is configured to remove the edge data associated with a distance in the first distance range and the edge data associated with a distance in the second distance range in response to the flag being output in the third state, and is configured to detect the target based on remaining edge data and the target data output from said radar.

5. The target detection system of claim 1, wherein the first state is a substantially stable state.

6. The target detection system of claim 5, wherein the flag output in the first state is output continuously for a temporary period of time.

7. The target detection system of claim 6, wherein the flag output in the second state is output intermittently.

8. The target detection system of claim 1, wherein the second state is a substantially unstable state.

9. The target detection system of claim 1, wherein the processing unit is configured to only select the edge data associated with a distance in the first distance range in response to the flag being output in the first state, configured to only select the edge data associated with a distance in the second distance range in response to the flag being output in the second state, and configured to only select the edge data associated with a distance in the third distance range in response to no flag being output.

* * * * *